United States Patent

Nagano

[11] Patent Number: 5,983,030
[45] Date of Patent: *Nov. 9, 1999

[54] OPTICAL APPARATUS HAVING A VISUAL AXIS DETECTOR

[75] Inventor: Akihiko Nagano, Ichihara, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/897,321

[22] Filed: Jul. 21, 1997

Related U.S. Application Data

[63] Continuation of application No. 08/489,633, Jun. 12, 1995, abandoned.

[30] Foreign Application Priority Data

Jun. 15, 1994 [JP] Japan .................................. 6-155523

[51] Int. Cl.⁶ .................................................. G03B 13/02
[52] U.S. Cl. .................................................. 396/51
[58] Field of Search .................................................. 396/51

[56] References Cited

U.S. PATENT DOCUMENTS

| | | | |
|---|---|---|---|
| 5,036,347 | 7/1991 | Tsuneka et al. | 354/400 |
| 5,182,443 | 1/1993 | Suda et al. | 250/201.2 |
| 5,214,166 | 5/1993 | Manser et al. | 549/510 |
| 5,225,862 | 7/1993 | Nagano et al. | 554/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,298,927 | 3/1994 | Konishi et al. | 351/211 |
| 5,317,629 | 5/1994 | Watanabe | 379/93 |
| 5,386,258 | 1/1995 | Nagano | 354/400 |
| 5,455,654 | 10/1995 | Suzuki | 354/402 |
| 5,485,241 | 1/1996 | Irie et al. | 354/410 |
| 5,486,892 | 1/1996 | Suzuki et al. . | |
| 5,579,079 | 11/1996 | Yamada et al. | 396/51 |

FOREIGN PATENT DOCUMENTS

| | | |
|---|---|---|
| 2264633 | 1/1990 | Japan . |
| 2264632 | 10/1990 | Japan . |
| 4138431 | 5/1992 | Japan . |
| 4138432 | 5/1992 | Japan . |
| 5100147 | 4/1993 | Japan . |

*Primary Examiner*—Safet Metjahic
*Assistant Examiner*—Michael Dalakis
*Attorney, Agent, or Firm*—Fitzpatrick, Cella, Harper & Scinto

[57] ABSTRACT

An optical apparatus including a first detection mechanism for detecting a corneal image reflected by a cornea of an eye and detecting information defining a refraction of spectacles, and a second detection mechanism for detecting the rotation amount of the eye using the detected corneal image of the eye and the information defining the refraction of the spectacles.

25 Claims, 13 Drawing Sheets

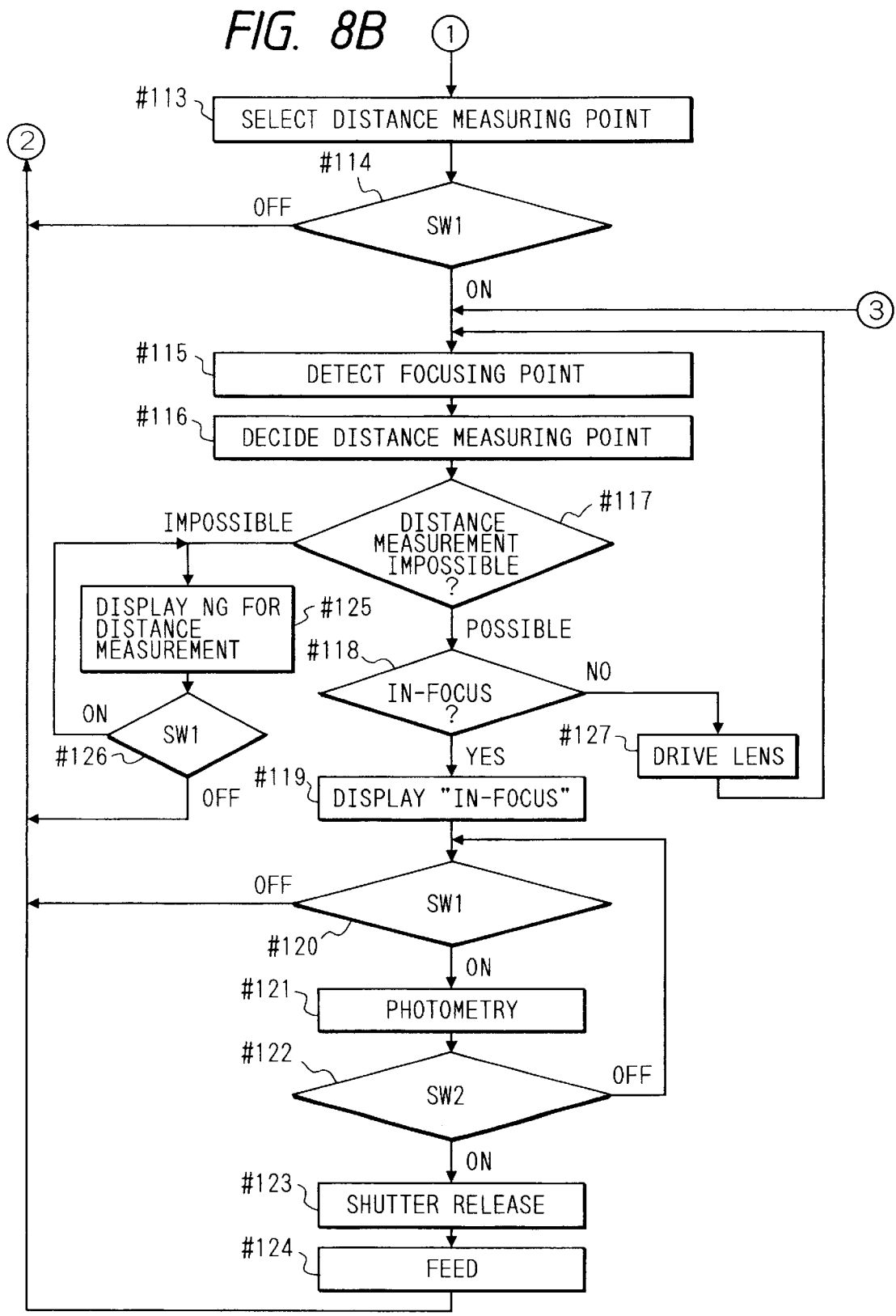

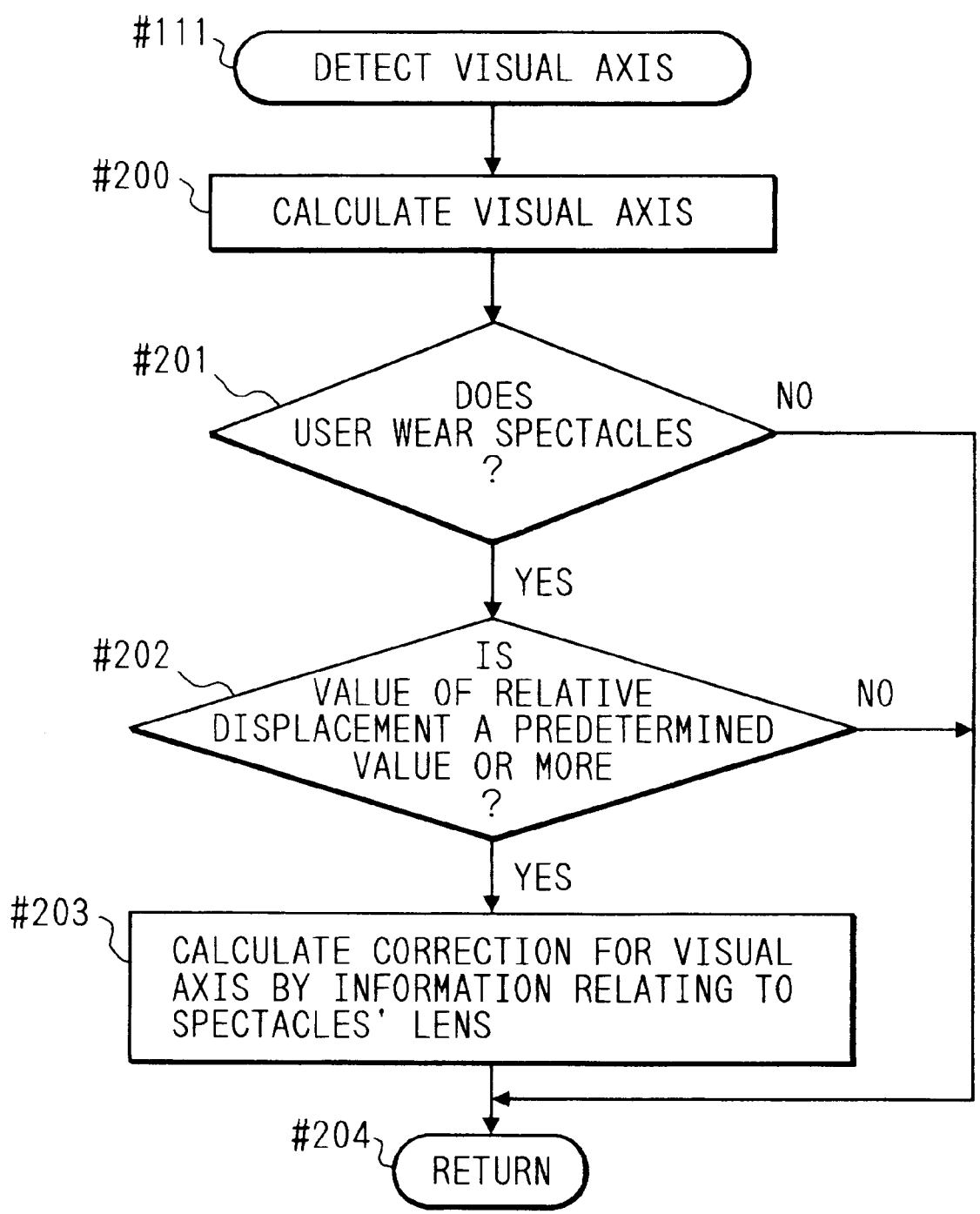

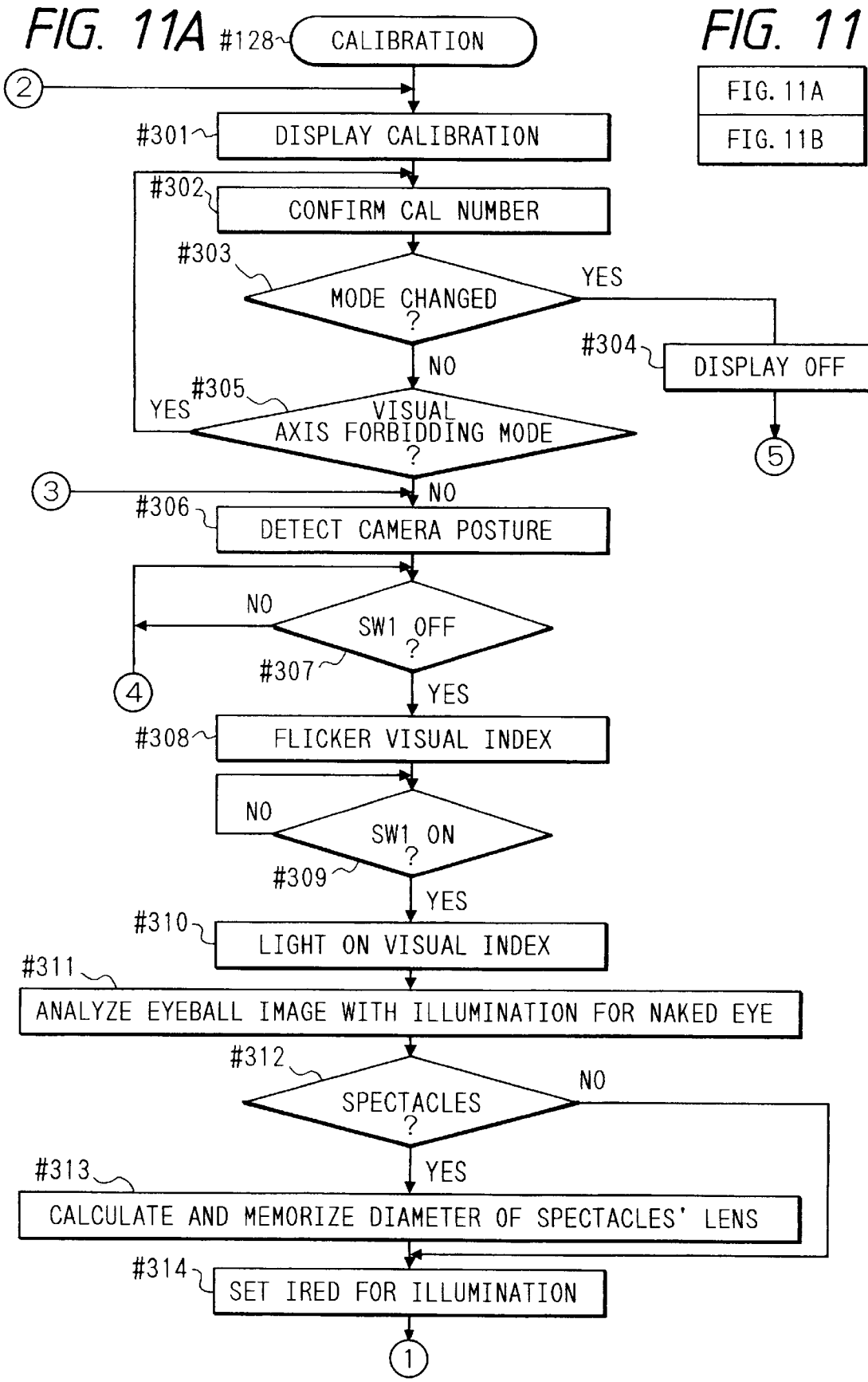

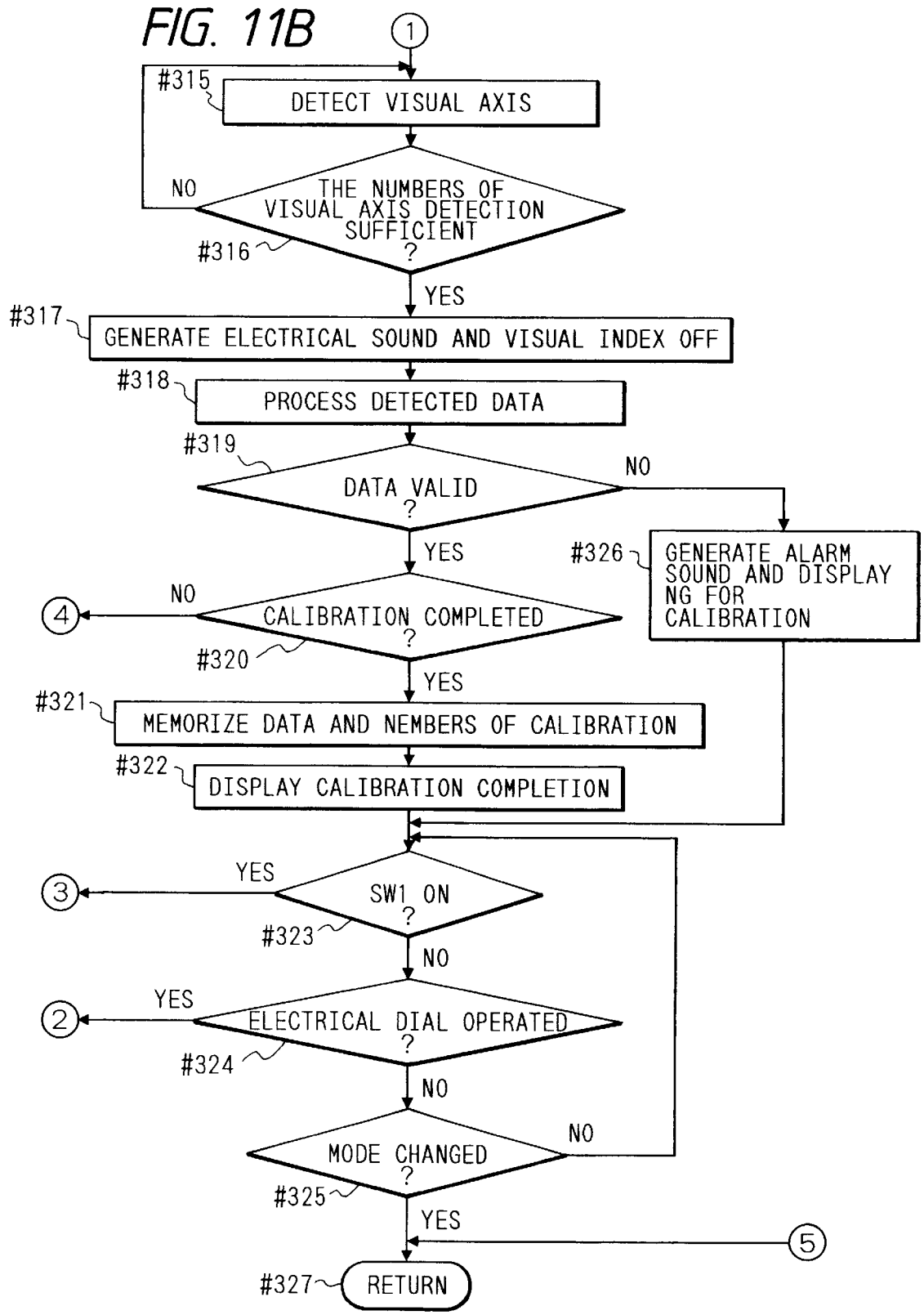

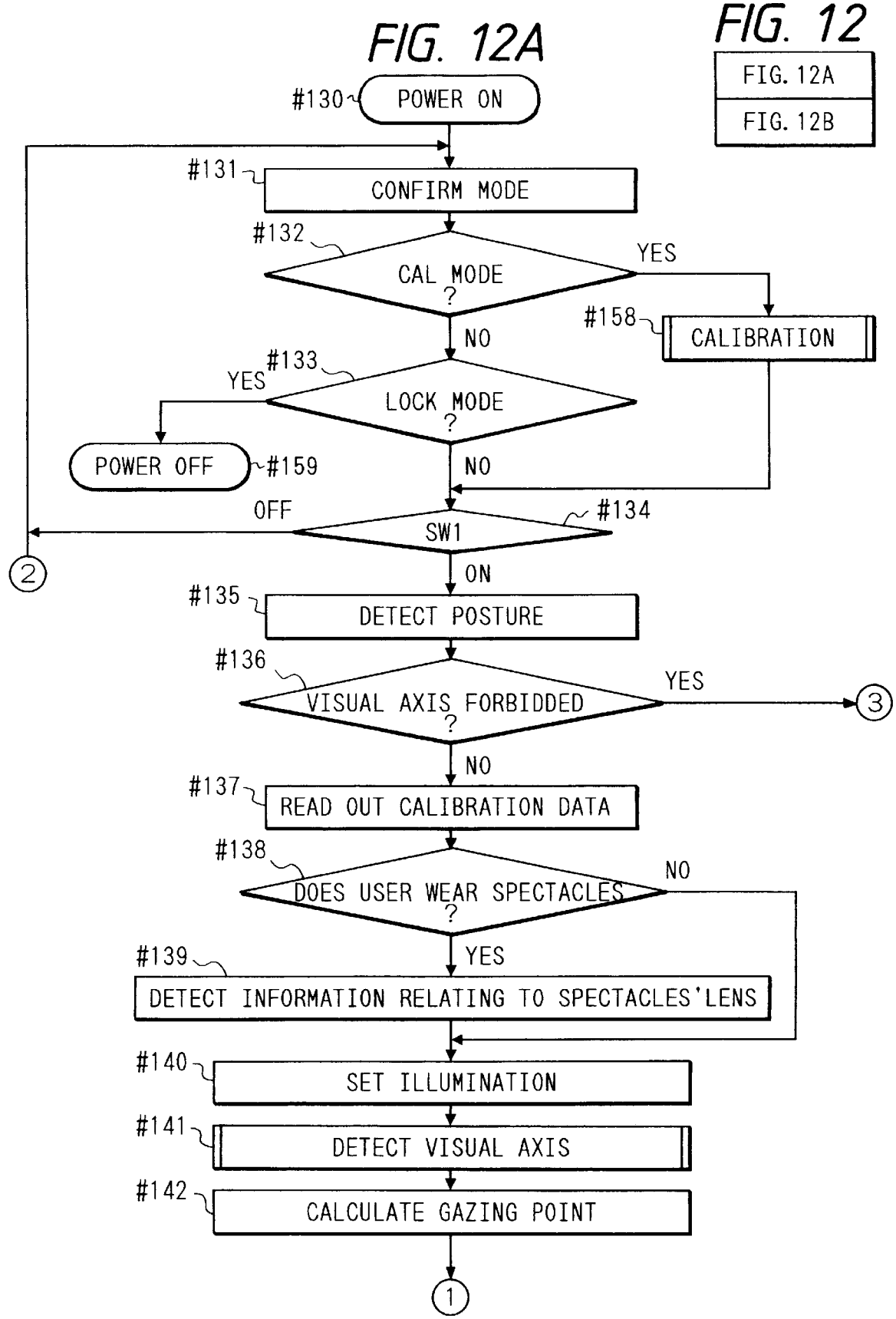

OPTICAL APPARATUS HAVING A VISUAL AXIS DETECTOR

This application is a continuation of application Ser. No. 08/489,633 filed Jun. 12, 1995, now abandoned.

BACKGROUND OF THE INVENTION

1. Field of the Invention

The present invention relates to an optical apparatus such as a camera having a detector for detecting a visual axis of an observer.

2. Related Background Art

Conventionally, various apparatuses (e.g., an eye camera) for detecting an observation position on an observation surface, i.e., a so-called visual axis, of an observer have been proposed.

Japanese Laid-Open Patent Application No. 2-264632 discloses a visual axis detection apparatus, which irradiates infrared rays onto an eyeball of an observer, and detects a visual axis of the observer by utilizing positions of cornea reflected images and an image of a pupil based on light reflected by the cornea of the eyeball.

FIG. 1 is an explanatory view of the principle of a known visual axis detection method.

Referring to FIG. 1, light sources 13a and 13b comprise, e.g., light-emitting diodes for irradiating infrared rays to which an observer is insensitive. The light sources 13a and 13b are arranged to be substantially symmetrical in the x-direction about the optical axis of a light-receiving lens 12, and illuminate an eyeball 15 of an observer with divergent light. The light sources 13a and 13b are arranged to illuminate the eyeball 15 of the observer from lower positions (i.e., positions offset in the y-direction). Some light components of the illumination light reflected by the eyeball 15 are focused on an image sensor 14 via the light-receiving lens 12. The eyeball 15 has a cornea 16 and an iris 17.

FIG. 2A is a schematic view of an image of an eyeball projected onto the image sensor 14, and FIG. 2B shows an intensity distribution of a signal from an output line of the image sensor 14.

The visual axis detection method will be described below with reference to FIG. 1 and FIGS. 2A and 2B.

Infrared rays emitted by the light source 13a irradiate the cornea 16 of the eyeball 15 of the observer. At this time, a cornea reflected image d formed by some light components of the infrared rays reflected by the surface of the cornea 16 is focused by the light-receiving lens 12, and is formed at a position d' on the image sensor 14. Similarly, infrared rays emitted by the light source 13b irradiate the cornea 16 of the eyeball 15. At this time, a cornea reflected image e formed by some light components of the infrared rays reflected by the surface of the cornea 16 is focused by the light-receiving lens 12, and is formed at a position e' on the image sensor 14.

On the other hand, light beams reflected by end portions a and b of the iris 17 form images of the end portions a and b at positions a' and b' on the image sensor 14 via the light-receiving lens 12. When the rotation angles, θ, of an optical axis 15a of the eyeball 15 with respect to the optical axis of the light-receiving lens 12 are small, if the x-coordinates of the end portions a and b of the iris 17 are respectively represented by xa and xb, the x-coordinate, xc, of the central position, c, of a pupil 19 is given by:

$$xc \approx (xa+xb)/2$$

On the other hand, the x-coordinate of the middle point between the cornea reflected images d and e substantially coincides with the x-coordinate, xo, of the center, o, of curvature of the cornea 16. For this reason, if the x-coordinates of the positions d and e of the cornea reflected images are respectively represented by xd and xe, and the standard distance between the center o of curvature of the cornea 16 and the center c of the pupil 19 is represented by $L_{OC}$, the rotation angle, θx, of the optical axis 15a of the eyeball 15 substantially satisfies:

$$L_{OC}*\sin\theta x \approx (xd+xe)/2-xc \qquad (1)$$

Note that * represents a multiplication in this specification. For this reason, as shown in FIG. 2A, by detecting the positions of the respective feature points (the cornea reflected images and the center of the pupil) of the eyeball 15 projected onto the image sensor 14, the rotation angles θ of the optical axis 15a of the eyeball 15 can be obtained.

From formula (1), the rotation angles of the optical axis 15a of the eyeball 15 are given by:

$$\beta*L_{OC}*\sin\theta x \approx \{(xpo-\delta x)-xic\}*\text{pitch} \qquad (2)$$

$$\beta*L_{OC}*\sin\theta y \approx \{(ypo-\delta y)-yic\}*\text{pitch} \qquad (3)$$

where θx is the rotation angle of the optical axis of the eyeball in the z-x plane, and θy is the rotation angle of the optical axis of the eyeball in the y-z plane. (xpo, ypo) is the coordinate position of the middle point between the two cornea reflected images on the image sensor 14, and (xic, yic) is the coordinate position of the center of the pupil on the image sensor 14. "pitch" is the pixel pitch of the image sensor 14. β is the imaging magnification determined by the position of the eyeball 15 with respect to the light-receiving lens 12, and is obtained as a function of the interval between the two cornea reflected images in practice. δx and δy are the correction terms for correcting the coordinates of the middle point between the cornea reflected images, which include a correction term for correcting an error caused by illumination of the eyeball of a photographer not with collimated light but with divergent light, and a correction term for correcting an offset component associated with δy, that is caused by illumination of the eyeball of the photographer with divergent light from the direction of the lower eyelid. The formulas of the correction terms are disclosed in Japanese Laid-Open Patent Application No. 2-264633.

After the rotation angles (θx, θy) of the optical axis 15a of the eyeball of the observer are calculated, the gazing point (x, y), on the observation surface, of the observer is, for example, given by:

$$x\,[mm]=m*\{\theta x-(cx*Rp+dx)\}/(ax*Rp+bx) \qquad (4)$$

$$y\,[mm]=m*\{\theta y-(cy*Rp+dy)\}/(ay*Rp+by) \qquad (5)$$

Note that the x-direction indicates the horizontal direction with respect to the observer, and the y-direction indicates the vertical direction with respect to the observer. m is a conversion coefficient for converting the rotation angle of the eyeball 15 into a coordinate on the observation surface, and Rp is the diameter of the pupil. ax, bx, cx, dx, ay, by, cy, and dy are gazing point calibration coefficients, i.e., correction coefficients for matching the rotation angles of the eyeball 15 of the observer with the gazing point on the observation surface. Japanese Laid-Open Patent Application Nos. 4-138431 and 4-138432 each disclose an apparatus having a visual axis detection device which can detect whether or not an observer wears spectacles. According to an embodiment of the proposed apparatus, when it is detected that an observer wears spectacles, the position adjustment of a light-receiving optical system, and the like is performed to attain satisfactory visual axis detection.

However, when an observer wears spectacles, the positions of the cornea reflected images and the iris image formed on the image sensor are displaced by the refraction effect of two refraction surfaces of a spectacles' lens (image distortion). In such a case, visual axis detection with high precision cannot be attained by the conventional visual axis calculation method.

Japanese Laid-Open Patent Application No. 5-100147 discloses a camera having a visual axis detection device which includes correction means for correcting or invalidating the visual axis detection result by detecting whether or not an observer wears spectacles. However, the correction means is controlled to limit the functions of the camera for an observer who wears spectacles (e.g., by limiting the visual axis detection area to the central area of the frame or disabling visual axis detection). For this reason, such an observer cannot fully use the functions of the camera, resulting in inconvenience.

SUMMARY OF THE INVENTION

It is an object of the present invention to provide an optical apparatus such as a camera, which allows high-precision visual axis detection for an observer who wears spectacles.

According to the first aspect of the present invention, an optical apparatus comprises first detection means for detecting an image related to an eye, and second detection means for detecting a rotation amount of the eye using the image related to the eye and information of a refraction surface of spectacles.

According to the second aspect of the present invention, an optical apparatus comprises illumination means for illuminating an eye of a user, light detection means for detecting light reflected by the eye, discrimination means for discriminating whether or not the user wears spectacles, memory means for storing information associated with a curvature of a refraction surface of spectacles, and rotation amount detection means for detecting a rotation amount of the eye by using an output from the light detection means, the rotation amount detection means detecting the rotation amount of the eye by using the output from the light detection means without using the information associated with the curvature of the refraction surface of spectacles when the user does not wear spectacles, and detecting the rotation amount of the eye by using the output from the light detection means and the information associated with the curvature of the refraction surface of spectacles when the user wears spectacles.

BRIEF DESCRIPTION OF THE DRAWINGS

FIG. 9 is a flow chart showing the visual axis detection operation executed in step 111 in FIG. 8;

FIG. 11 is comprised of FIGS. 11A and 11B showing flow charts of the visual axis calibration operation executed in step 128 in FIG. 8A.

DETAILED DESCRIPTION OF THE PREFERRED EMBODIMENTS

The present invention will be described in detail hereinafter with reference to the illustrated embodiments.

Figure 1:
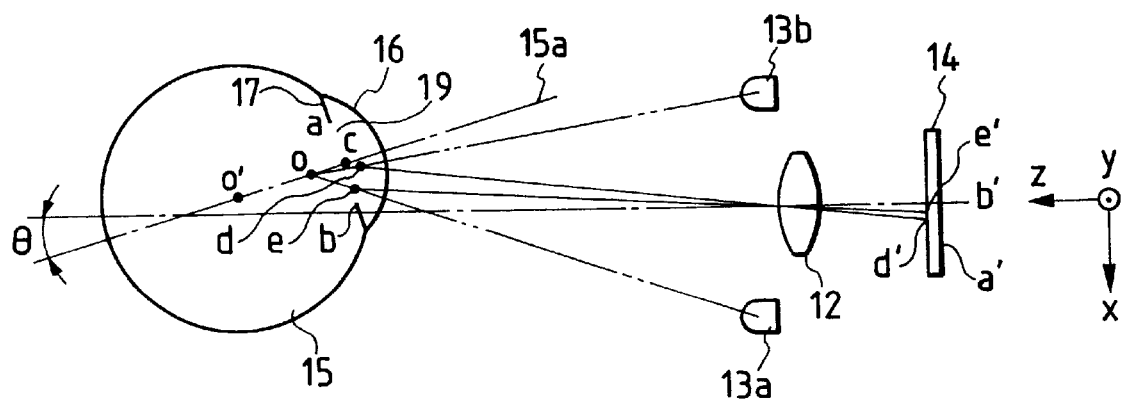
FIG. 1 is a view for explaining the principle of visual axis detection.
Figure 2A:
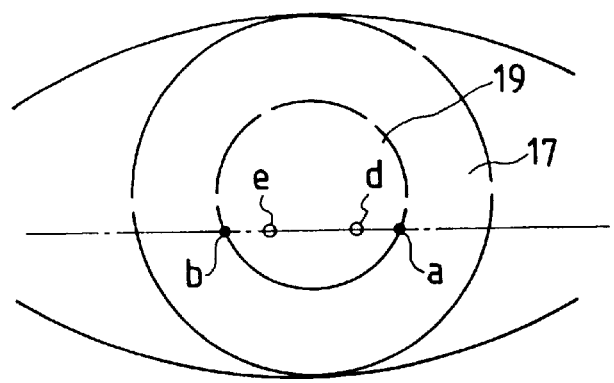
FIGS. 2A and 2B are views for explaining an eyeball image and the output intensity distribution obtained upon photoelectric conversion of the eyeball image.
Figure 2B:
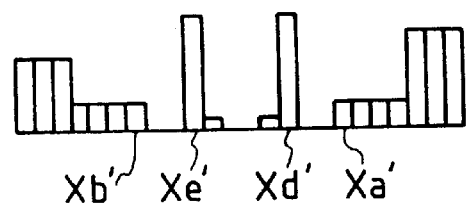
Figure 3:
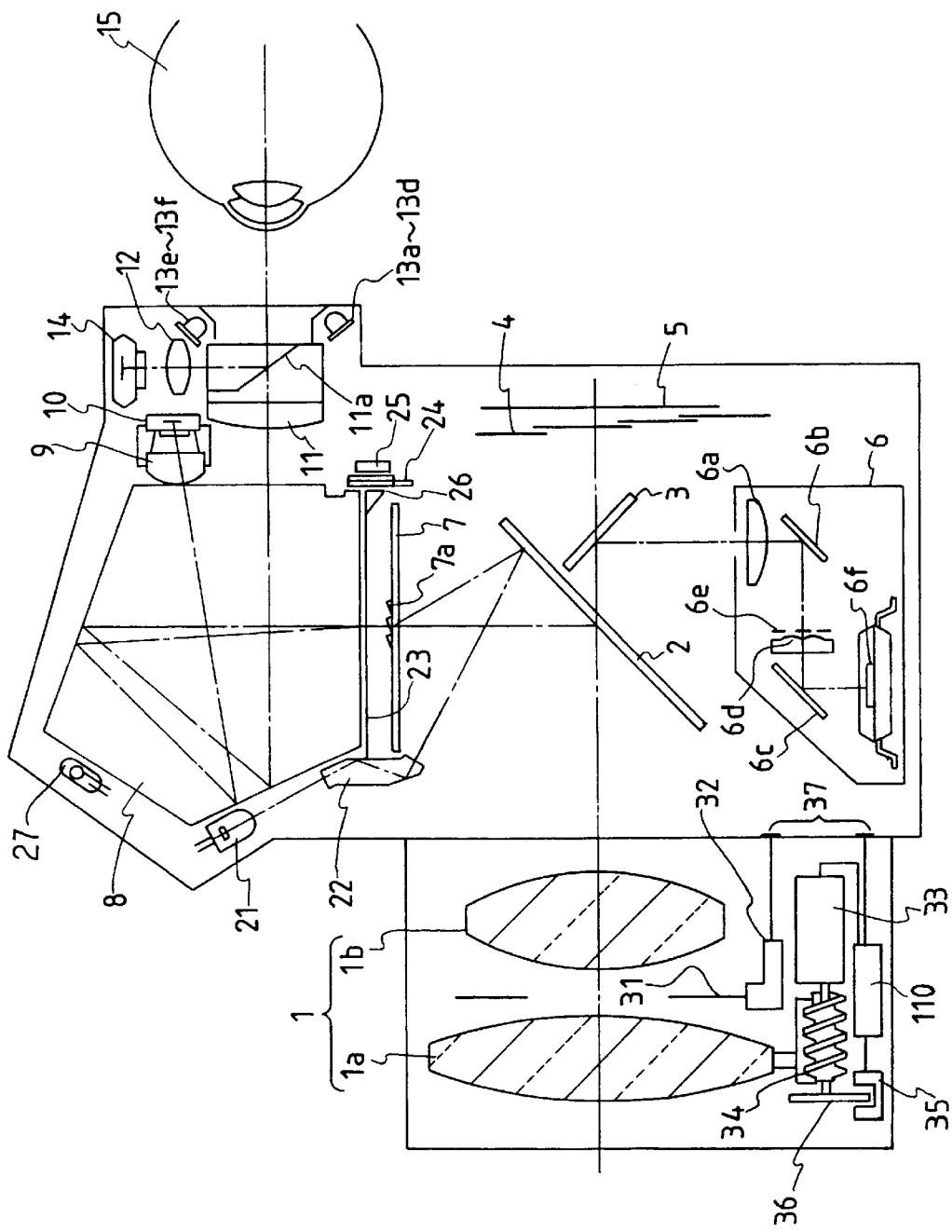
FIG. 3 is a sectional view showing the arrangement of a camera according to the first embodiment of the present invention.
Figure 4A:
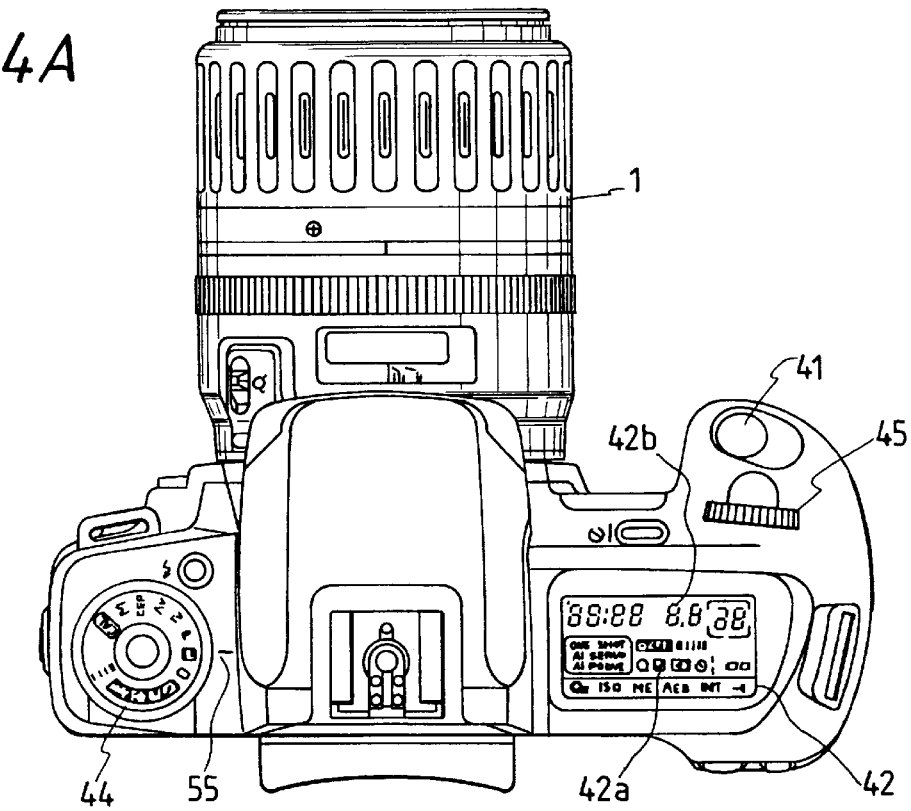
FIGS. 4A and 4B are respectively a top view and a rear view of the camera shown in FIG. 3.
Figure 4B:
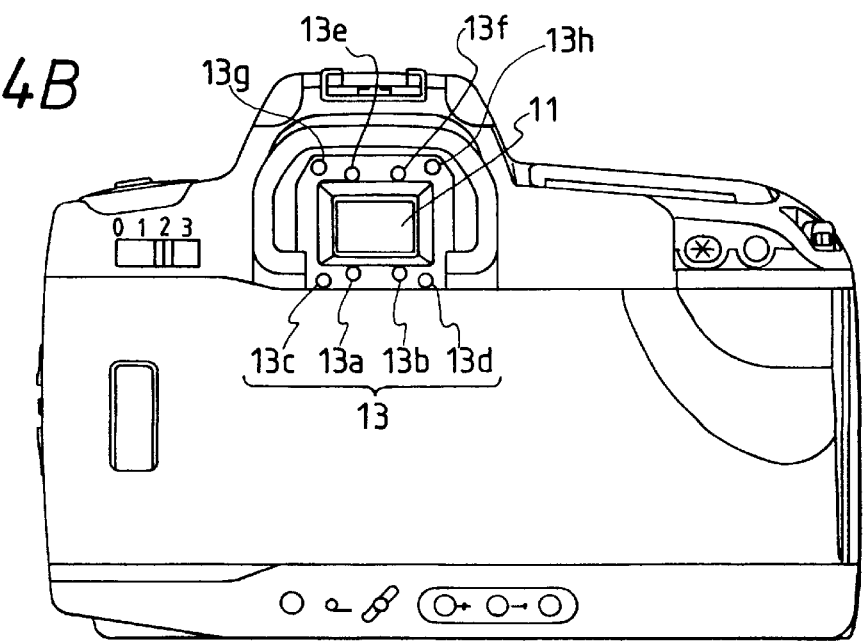
Figure 5:
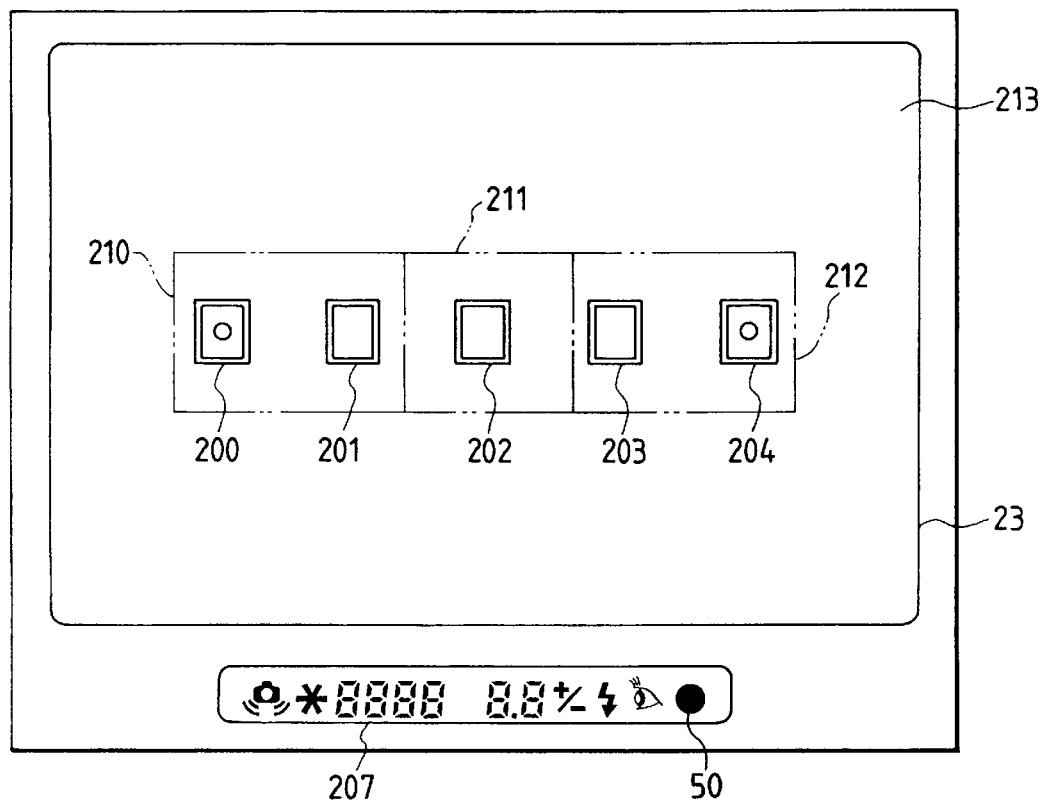
FIG. 5 is a view showing the arrangement in a finder field of the camera shown in FIG. 3.

FIG. 3 is a schematic view showing a principal part of an embodiment in which the present invention is applied to a single-lens reflex camera, FIGS. 4A and 4B are respectively a top view and a rear view of the camera, and FIG. 5 is an explanatory view of the arrangement in the finder field shown in FIG. 3.

Referring to FIGS. 3 to 5, a photographing lens 1 is constituted by two lenses in FIG. 3 for the sake of simplicity, but is constituted by a larger number of lenses in practice. A main mirror 2 is obliquely inserted into and retracted from the photographing path in accordance with the observation state and the photographing state of an image of an object to be photographed. A sub mirror 3 reflects a light beam transmitted through the main mirror 2 toward a focusing point detecting device 6 (to be described later) arranged in a lower portion of a camera body.

A shutter 4 is arranged in front of a photosensitive member 5, which comprises a silver halide film, a solid-state image pickup element such as a CCD or a MOS type device, or an image pickup tube such as a VIDICON.

The focusing point detecting device 6 is constituted by a field lens 6a arranged in the vicinity of an imaging plane, reflection mirrors 6b and 6c, a secondary imaging lens 6d, an aperture 6e, a line sensor 6f comprising a plurality of CCDs, and the like.

The focusing point detecting device 6 in this embodiment attains focusing point detection by a known phase difference method. As shown in FIG. 5, the focusing point detecting device 6 can attain focusing point detection (defocus detection) of each of a plurality of areas (five distance measurement point marks 200 to 204) in an observation frame (finder field) 213.

A focusing screen 7 is arranged on the prospective imaging plane of the photographing lens 1. A pentagonal prism 8 serves as an erected image formation optical member. An imaging lens 9 and a photometry sensor 10 are used for measuring luminance of the object observed in the observation frame 213. The imaging lens 9 makes the focusing screen 7 and the photometry sensor 10 conjugate with each other via a reflection optical path in the pentagonal prism 8.

An eyepiece lens 11 with a beam splitter 11a is arranged behind the exit surface of the pentagonal prism 8, and is used for observing the focusing screen 7 by an eye 15 of a photographer. The beam splitter 11a comprises, e.g., a dichroic mirror for transmitting visible light and for reflecting infrared rays.

A light-receiving lens 12 is arranged below an image sensor 14 (also referred to as a CCD hereinafter) constituted by two-dimensionally arranging photoelectric conversion element arrays such as CCDs. The image sensor 14 is arranged to be conjugate with a position in the vicinity of the pupil of the eyeball 15 of the photographer, which is located at a predetermined position in association with the light-receiving lens 12.

Infrared light-emitting diodes (to be abbreviated as IREDs hereinafter) 13a to 13h serve as illumination light sources for the eyeball 15 of the photographer, and are arranged around the eyepiece lens 11, as shown in FIG. 4B. Note that the IREDs 13a, 13b, 13e, and 13f are used for illuminating the naked eye of a photographer who does not wear spectacles, and the IREDs 13c, 13d, 13g, and 13h which are arranged at positions free from a ghost are used for illuminating the eye of a photographer who wears spectacles.

Light emitted by each of high-luminance superimpose LEDs 21 can be visually confirmed even in a bright object. Light emitted by each LED 21 is reflected by the main mirror 2 via a light projection prism 22, is perpendicularly deflected by micro-prism arrays 7a formed on a display portion of the focusing screen 7, and reaches the eyeball 15 of the photographer via the pentagonal prism 8 and the eyepiece lens 11.

The micro-prism arrays 7a are formed in a frame pattern at a plurality of positions, corresponding to the focusing point detecting areas, on the focusing screen 7, and are illuminated with five superimpose LEDs 21 (LED-L1, LED-L2, LED-C, LED-R1, and LED-R2) corresponding thereto. As can be seen from the finder field shown in FIG. 5, the respective distance measurement point marks 200, 201, 202, 203, and 204 shine in the finder field and the corresponding focusing point detecting areas (distance measurement points) can be displayed (such a display will be referred to as a superimpose display hereinafter).

A finder mask 23 forms a finder field region. An LCD 24 in the finder is used for displaying photographing information on a portion outside the finder field, and is illuminated with light emitted by an illumination LED (F-LED) 25. Light transmitted through the LCD 24 in the finder is guided into the finder field via a triangular prism 26, and displays photographing information 207 on a portion outside the finder field. With this display, the photographer can confirm the photographing information. A mercury switch 27 is used for detecting the posture of the camera.

The photographing lens 1 includes an aperture 31, a driving device 32 including an aperture driving circuit 111 (to be described later), a lens driving motor 33, and a lens driving member 34 comprising, e.g., a driving gear. A photocoupler 35 detects the rotation of a pulse plate 36 interlocked with the lens driving member 34, and supplies the detected information to a lens focusing point adjusting circuit 110. The focusing point adjusting circuit 110 drives the lens driving motor 33 by a predetermined amount on the basis of this information and the information of a lens driving amount supplied from the camera body side, thereby moving the photographing lens 1 to an in-focus position. A mount contact 37 serves as a known interface between the camera body and the lens.

Referring to FIGS. 4A and 4B, a release button 41 is arranged near an LCD 42 for monitor, which serves as an external monitor display device. The LCD 42 consists of a fixed segment display portion 42a for displaying predetermined patterns, and a 7-segment display portion 42b for displaying variable numerals. A mode dial 44 is used for selecting, e.g., a photographing mode using an index 55. Other operation members are not directly related to the present invention, and a detailed description thereof will be omitted.

Figure 6:
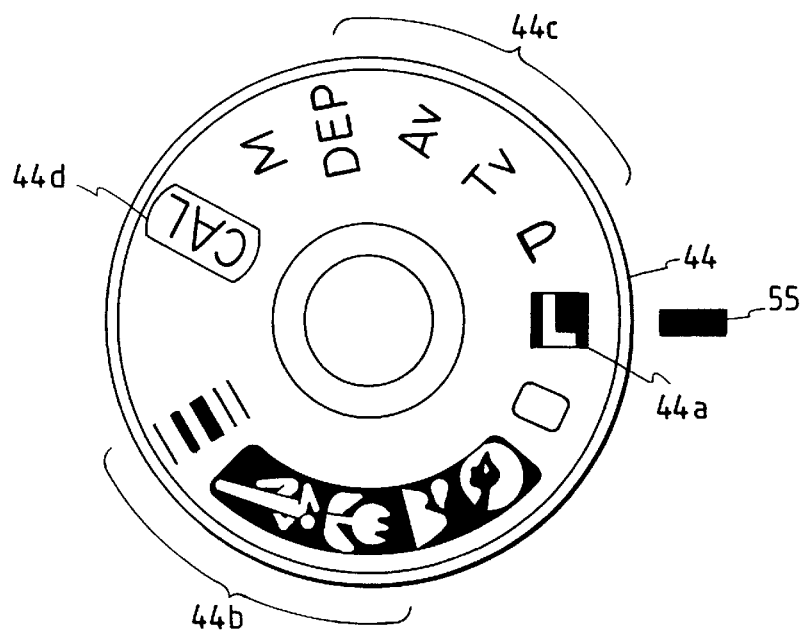
FIG. 6 is a top view of a mode dial shown in FIG. 4A.

FIG. 6 shows in detail the mode dial 44 shown in FIGS. 4A and 4B. When a mark on the mode dial 44 is adjusted to the index 55 formed on the camera body, a photographing mode is set in accordance with the contents of the mark.

Referring to FIG. 6, the mode dial 44 has a lock position 44a for making the camera inoperative, an auto photographing mode position 44b at which the camera is controlled by a pre-set photographing program, and a manual photographing mode position 44c which includes program AE ("P"), shutter priority AE ("Tv"), aperture priority AE ("Av"), object depth priority AE ("DEP"), and manual exposure ("M") photographing mode positions. The mode dial 44 also has a "CAL" position 44d at which a calibration mode for performing calibration of the visual axis (to be described later) is set.

Referring back to FIGS. 4A and 4B, an electrical dial 45 is used for setting a setting value, which can be further selected in the mode selected by the mode dial 44, by generating click pulses when it is turned.

Figure 7:
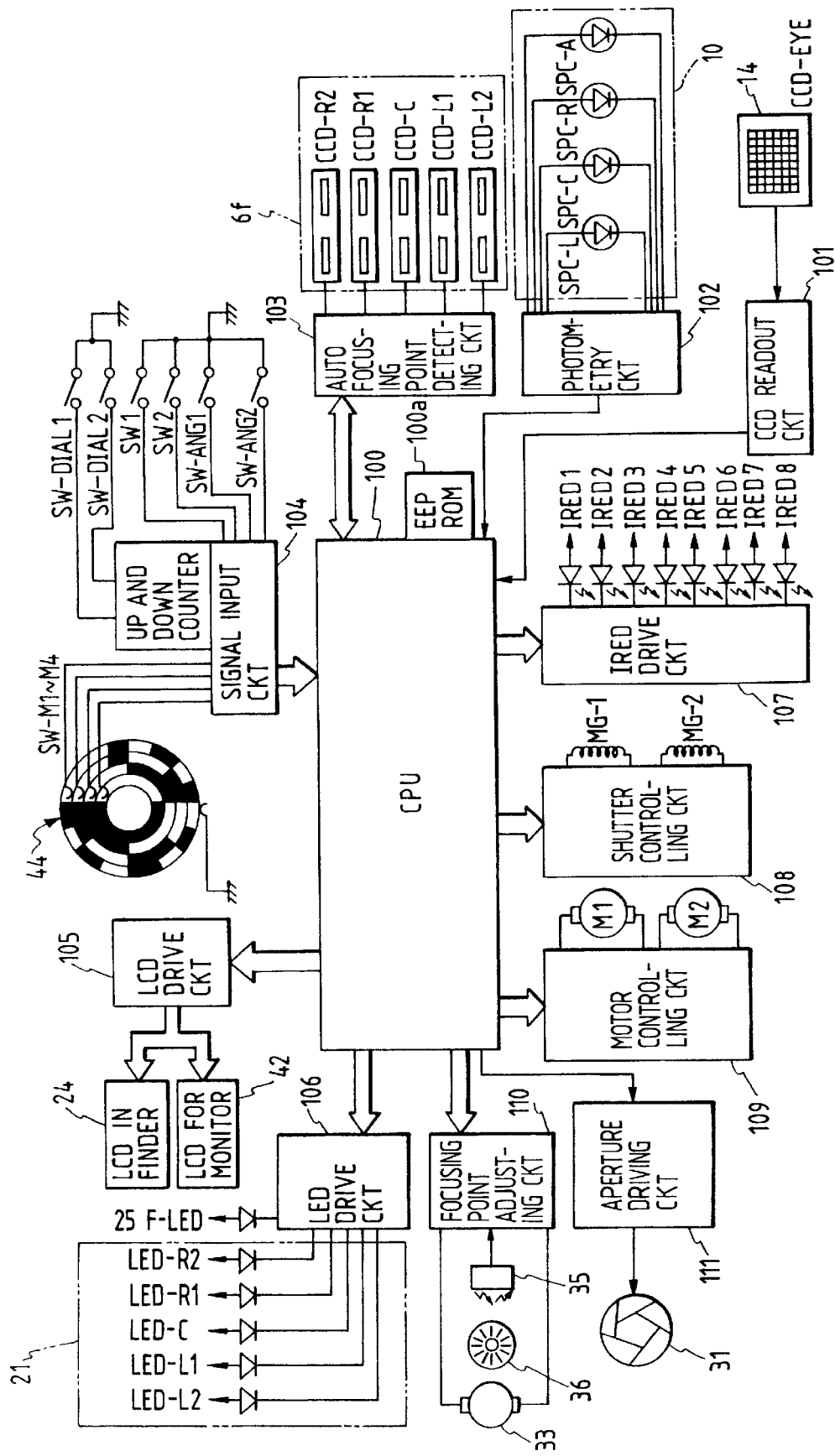
FIG. 7 is a block diagram showing the electrical arrangement of the camera shown in FIG. 3.

FIG. 7 is a block diagram showing the electrical arrangement incorporated in the single-lens reflex camera with the above arrangement. Note that the same reference numerals in FIG. 7 denote the same parts as in FIG. 3.

A central processing unit (to be abbreviated as a CPU hereinafter) 100 which comprises a microcomputer incorporated in the camera body is connected to a CCD read out circuit 101, a photometry circuit 102, an auto focusing point detecting circuit 103, a signal input circuit 104, an LCD drive circuit 105, an LED drive circuit 106, an IRED drive circuit 107, a shutter controlling circuit 108, and a motor controlling circuit 109. The CPU 100 exchanges signals with the focusing point adjusting circuit 110 and an aperture driving circuit 111 arranged in the photographing lens 1 via the mount contact 37 shown in FIG. 3.

An EEPROM 100a as memory means of the CPU 100 can store the positions of the CCDs and the IREDs as electric parts constituting a visual axis detection system.

The CCD read out circuit 101 A/D-converts an eyeball image output from the image sensor 14 (CCD-EYE), and transmits the converted image information to the CPU 100. The CCD read out circuit 101 and the image sensor 14 constitute light-receiving means together with optical members such as the light-receiving lens 12, and the like. As will be described later, the CPU 100 extracts the feature points of the eyeball image required for visual axis detection in accordance with a predetermined algorithm, and calculates the rotation angles of the eyeball of the photographer in accordance with the positions of the extracted feature points.

The photometry circuit 102 logarithmically compresses and A/D-converts the output from the photometry sensor 10 after it amplifies the output, and supplies the converted information to the CPU 100 as the luminance information of respective sensors. The photometry sensor 10 is constituted by four photodiodes, i.e., a photodiode SPC-L for performing photometry of a left area 210 including the left-side distance measurement points 200 and 201 in the finder frame shown in FIG. 5, a photodiode SPC-C for performing photometry of a central area 211 including the central distance measurement point 202, a photodiode SPC-R for performing photometry of a right area 212 including the right-side distance measurement points 203 and 204, and a photodiode SPC-A for performing photometry of the area 213 around these areas.

The line sensor 6f is a known CCD line sensor constituted by five pairs of line sensors CCD-L2, CCD-L1, CCD-C, CCD-R1, and CCD-R2 corresponding to the five distance measurement points 200 to 204 in the frame, as described above. The auto focusing point detecting circuit 103 A/D-converts voltages obtained from these sensors in the line sensor 6f, and supplies converted data to the CPU 100.

A switch SW1 is turned on at the first stroke position of the release button 41 to start photometry, AF, and visual axis detection operations. A release switch SW2 is turned on at the second stroke position of the release button. Posture detection switches SW-ANG1 and SW-ANG2 detect camera posture by using the mercury switch 27 and another mercury switch (not shown). Dial switches SW-DIAL1 and SW-DIAL2 are arranged in the electrical dial 45. The outputs from these switches are input to an up-and-down counter of the signal input circuit 104, thereby counting the rotary click amount of the electrical dial 45. Dial switches SW-M1 to SW-M4 are arranged in the mode dial.

The signals from these switches are input to the signal input circuit 104, and are transmitted to the CPU 100 via a data bus.

The known LCD drive circuit 105 for display-driving a liquid crystal display element LCD simultaneously drives both the LCD 42 for monitor and the LCD 24 in the finder to display the aperture value, shutter speed, selected photographing mode, or the like in accordance with the signal from the CPU 100.

The LED drive circuit 106 ON/OFF-controls the illumination LED (F-LED) 25 and the superimpose LEDs 21. The IRED drive circuit 107 selectively turns on the infrared light-emitting diodes (IRED1 to IRED8) 13a to 13h in accordance with a situation. The shutter controlling circuit 108 controls energization of magnets MG-1 and MG-2 for respectively moving the leading and trailing curtains to expose the photosensitive member with a predetermined amount of light.

The motor controlling circuit 109 controls a motor M1 for performing the winding and rewinding operations of a film, and a motor M2 for charging the main mirror and the shutter 4.

The above-mentioned shutter controlling circuit 108 and motor controlling circuit 109 operate a series of release sequences of the camera.

The operation of the camera with spectacles' lens information detection means will be described below with reference to the flow charts in FIGS. 8A and 8B.

When the mode dial 44 is turned to set the camera from an inoperative state (lock state) to a predetermined photographing mode, the power supply of the camera is turned on (step 100).

The CPU 100 confirms the selected mode of the mode dial 44 via the signal input circuit 104 (step 101). As a result, if the mode dial 44 is set in the visual axis calibration (CAL) mode (step 102), calibration of the gazing point is executed (step 128). The calibration of the gazing point will be described later. Upon completion of the calibration of the gazing point, the camera waits until the switch SW1 is turned on upon depression of the release button 41 (step 104).

If the mode dial 44 is not set in the visual axis calibration mode (step 102) but is set in the power lock mode (step 103), the power supply of the camera is turned off (step 129).

On the other hand, if the mode dial 44 is set in the normal photographing mode, the camera waits until the switch SW1 is turned on upon depression of the release button 41 (step 104).

When it is detected via the signal input circuit 104 that the switch SW1 is turned on upon depression of the release button 41, the CPU 100 detects the current posture of the camera using posture detection means (step 105). Note that the posture detection means comprises the CPU 100, the signal input circuit 104, and the posture detection switches SW-ANG1 and SW-ANG2. The CPU 100 analyzes the signals from the posture detection switches SW-ANG1 and SW-ANG2 input via the signal input circuit 104, and determines whether the camera is set at the horizontal or vertical position (posture).

The CPU 100 then confirms the calibration data number, which indicates one of a plurality of calibration data to be used in visual axis detection, by the EEPROM 100a. At this time, if the confirmed calibration data number is set in the visual axis input forbid mode (step 106), the CPU 100 immediately executes focusing point detection for the respective distance measurement points without executing any visual axis detection operation (step 115).

On the other hand, if the calibration data number is set to be a value corresponding to the visual axis input mode (step 106), the CPU 100 reads out calibration data corresponding to the calibration data number from a predetermined address of the EEPROM 100a (step 107). The calibration data includes information indicating whether or not a photographer wears spectacles, and if the CPU 100 determines based on the calibration data that the photographer does not wear spectacles (step 108), the CPU 100 sets illumination for a naked-eye photographer to execute visual axis detection (step 110). For example, when the posture of the camera corresponds to the horizontal state (lateral state), the CPU 100 selects and turns on the IREDs 13a and 13b via the IRED drive circuit 107.

On the other hand, if the CPU 100 determines based on the calibration data that the photographer wears spectacles (step 108), the CPU 100 reads out the lens information of the spectacles of the photographer, which information is stored at a predetermined address on the EEPROM 100a in accordance with the calibration data number (step 109). The lens information of the spectacles is the radius of curvature of the spectacles' lens. Note that this information is pre-stored in the EEPROM 100a by a calibration operation to be described later. When the spectacles' lens information is read out, the CPU 100 sets illumination for a naked-eye photographer to execute visual axis detection (step 110). For example, when the posture of the camera corresponds to the horizontal state, the CPU 100 selects and turns on the IREDs 13a and 13b via the IRED drive circuit 107, as described above.

When the illumination to the eyeball 15 of the photographer is set (step 110), the CPU 100 executes visual axis detection (step 111).

The visual axis detection operation in step 111 will be described below with reference to the flow chart in FIG. 9.

When the eyeball 15 of the photographer is illuminated with light emitted by the illumination means, some light components of infrared rays reflected by the eyeball 15 are focused on the image sensor 14 via the light-receiving optical system as the light-receiving means. An image output from the image sensor 14 is A/D-converted by the CCD read out circuit 101, and the converted image data is analyzed by the CPU 100 as visual axis calculation means.

When the CPU 100 detects the cornea reflected images and the central position of the pupil as the feature points of the eyeball 15, it calculates the visual axis [(θx, θy): the rotation angles of the eyeball] of the photographer on the basis of formulas (2) and (3) above (step 200). At this time, if the photographer does not wear spectacles (step 201), the flow returns to the main routine (step 204).

On the other hand, if the photographer wears spectacles (step 201), the CPU 100 calculates a reference position of the camera with respect to the eyeball 15 of the photographer, e.g., a relative displacement amount from the central position of the exit-side refraction surface (a surface on the photographer side) of the eyepiece lens 11, on the basis of the positions of the analyzed feature points of the eyeball 15 of the photographer. If the displacement of the center o of curvature of the cornea 16 of the eyeball 15 of the photographer from the finder optical axis is represented by (sx, sy), the displacement (sx, sy) is given by:

$$sx \text{ [mm]} = \{(xpo - \delta x - xs) * \text{pitch}\}/\beta \quad (6)$$

$$sy \text{ [mm]} = \{(ypo - \delta y - ys) * \text{pitch}\}/\beta \quad (7)$$

where (xs, ys) represents the central pixel (a pixel on the optical axis of the light-receiving optical system) of the image sensor 14.

If the displacement [=sqr(sx^2+sy^2)] of the center o of curvature of the cornea 16 of the eyeball 15 of the photographer from the finder optical axis is smaller than a predetermined value (e.g., 4.0 [mm]) (step 202), since the influence of the refraction effect of the spectacles' lens is small, the flow returns to the main routine without performing visual axis correction (step 204).

On the other hand, if the displacement [=sqr(sx^2+sy^2)] of the center o of curvature of the cornea 16 of the eyeball 15 of the photographer from the finder optical axis is equal to or larger than the predetermined value (e.g., 4.0 [mm]) (step 202), the CPU 100 corrects the positions of the cornea reflected images and the value of the central pixel (xs, ys) of the image sensor 14 on the basis of the spectacles' lens information (radius of curvature) read out from the EEPROM 100a as memory means, and thereafter, calculates the visual axis (θx, θy) of the photographer on the basis of formulas (2) and (3) above (step 203). After the visual axis of the photographer is corrected and calculated (step 203), the flow returns to the main routine to continue the camera sequence (step 204).

Figure 10:
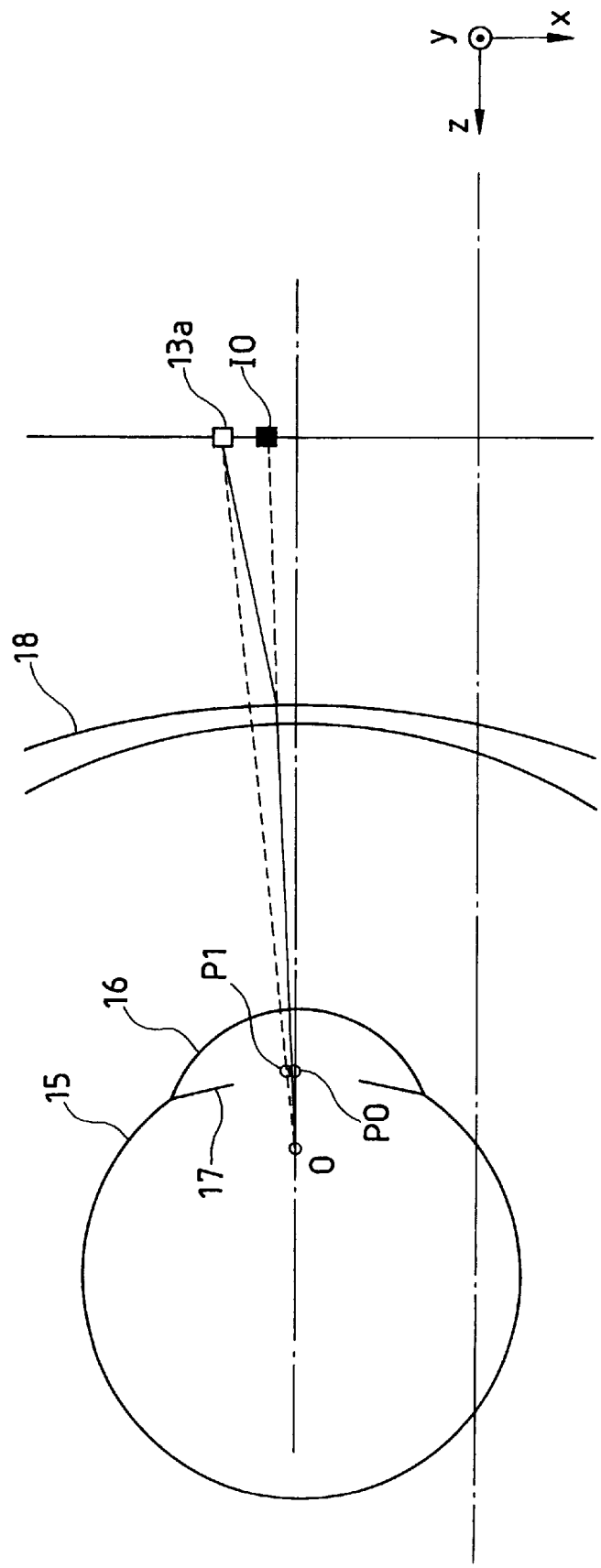
FIG. 10 is a view for explaining a case wherein a user who looks into the camera finder wears spectacles.

FIG. 10 is an explanatory view for explaining the refraction effect of the spectacles' lens and the method of correcting the positions of the cornea reflected images.

Referring to FIG. 10, the eyeball 15 of a photographer is displaced in the -x-direction from the finder optical axis (not shown; matching with the z-axis in FIG. 10), and only one IRED for illuminating the eyeball 15 of the photographer is illustrated. Note that the illumination IRED 13a and the exit surface of the eyepiece lens 11 are arranged on an identical plane.

Infrared rays emitted by the IRED 13a are refracted by a spectacles' lens 18, and illuminate the eyeball 15 of a photographer. A light ray which propagates toward the center o of curvature of the cornea 16 of the eyeball 15 of the photographer is indicated by a solid line in FIG. 10. A virtual image of the cornea reflected image is generated at a position P0 (x-coordinate) in FIG. 10 for a photographer who wears spectacles. If the photographer does not wear spectacles, the virtual image of the cornea reflected image is generated at a position P1 in FIG. 10 (on a dotted line in FIG. 10). For this reason, the position P0 of the cornea reflected image of a photographer who wears spectacles must be corrected to the position P1 of the cornea reflected image of a naked-eye photographer, so that the photographer who wears spectacles obtains visual detection precision equivalent to that for the naked-eye photographer.

When the x-coordinates of the cornea reflected images projected onto the image sensor are respectively represented by xp0 and xp1, they satisfy:

$$xp1 \text{ [pixel]} = xp0 + \delta xp \quad (8)$$

where δxp is the correction value for correcting the positions of the cornea reflected images of a photographer who wears spectacles, and is given by:

$$\delta xp \text{ [pixel]} = \{(2*sz-Rc)/(2*sz)\}*(sxi-si0)*\beta/\text{pitch}$$

where sz is the distance, in the z-direction, between the center o of curvature of the cornea 16 and the setting surface of the IRED 13a, Rc is the radius of curvature of the cornea 16, and sxi is the distance, in the x-direction, between the IRED 13a and the finder optical axis (z-axis). Also, si0 is the distance, in the x-direction, between an apparent position IO of the IRED 13a when viewed from a photographer who wears spectacles, and the finder optical axis (z-axis). The apparent position IO of the IRED 13a is obtained by setting the spectacles' lens for the eyeball 15 of the photographer on the basis of the spectacles' lens information (radius of curvature), and tracing light rays by using the Snell's law.

In practice, since the eyeball 15 of the photographer is illuminated with light from the two IREDs, the positions, in the x- and y-directions, of the cornea reflected images for these two IREDs must be corrected.

The same applies to the correction of the central pixel (xs, ys) of the image sensor 14. That is, the spectacles' lens is set on the basis of the spectacles' lens information, and light rays are traced to determine how the spectacles' lens 18 refracts the optical axis of the light-receiving optical system, thereby obtaining an intersection with the image sensor 14. The pixel at the intersection can be defined as the central pixel of the image sensor 14.

After the positions of the cornea reflected images and the value of the central pixel (xs, ys) of the image sensor 14 are corrected, the visual axis is calculated again on the basis of formulas (2) and (3) above.

Referring back to FIGS. 8A and 8B, upon completion of the visual axis detection (step 111), the CPU 100 calculates the gazing point in the finder from the calculated visual axis [the rotation angles (θx, θy) of the eyeball] (step 112). The coordinate position (x, y) of the gazing point in the finder is calculated by formulas (4) and (5) above.

After the gazing point in the finder, where the photographer gazes, is calculated (step 112), the distance measurement point to be subjected to focusing point detection is selected based on the coordinate position of the gazing point (step 113). In this case, a distance measurement point closest to the coordinate position of the gazing point is selected. Furthermore, the CPU 100 transmits a signal to the LED drive circuit 106 to display the selected distance measurement point in the finder by flickering one of the marks 200 to 204.

If the photographer recognizes that the distance measurement point superimpose-displayed in the finder is different from that he or she intended upon observation of the displayed point, and releases his or her finger from the release button 41 to turn off the switch SW1, when the CPU 100 detects this operation via the signal input circuit 104

(step 114), the CPU 100 confirms the mode again via the signal input circuit 104 (step 101), and waits until the switch SW1 is turned on if the normal photographing mode is currently selected (step 104).

When the photographer keeps the switch SW1 ON upon observation of the superimpose-displayed distance measurement point (step 114), the CPU 100 executes focusing point detection of the distance measurement point, selected by the visual axis information, using the auto focusing point detecting circuit 103 (step 115). Upon completion of the focusing point detection (step 115), the CPU 100 then determines the distance measurement point to be subjected to focusing point adjustment of the photographing lens 1 in practice (step 116). At this time, if the camera is set in the visual axis input forbid mode, a distance measurement point corresponding to the shortest object distance of all the distance measurement points subjected to focusing point detection is determined as one to be subjected to focusing point adjustment of the photographing lens 1 in practice.

It is checked if distance measurement at the distance measurement point determined by the visual axis information is impossible (step 117). If distance measurement is impossible, the CPU 100 supplies a signal to the LCD drive circuit 105 to flicker an in-focus mark 50 on the LCD 24 in the finder, thereby generating an alarm to inform the photographer of the fact that the distance measurement is NG (impossible) (step 125). This alarm display is continued until the switch SW1 is released (step 126).

If the determined distance measurement point can be subjected to distance measurement (step 117) and if the focusing point adjusting state of the photographing lens 1 corresponding to the distance measurement point is not in an in-focus state (step 118), the CPU 100 supplies a signal to the lens focusing point adjusting circuit 110 to drive a focusing lens 1a of the photographing lens 1 by a predetermined amount (step 127). After the lens is driven, the CPU 100 performs focusing point detection for the determined distance measurement point via the auto focusing point detecting circuit 103 again (step 115) to check if the photographing lens 1 has reached an in-focus state (step 118). If the photographing lens has reached an in-focus state (step 118), the CPU 100 supplies a signal to the LCD drive circuit 105 to turn on the in-focus mark 50 on the LCD 24 in the finder, and also supplies a signal to the LED drive circuit 106 to perform an in-focus display on the in-focus distance measurement point (step 119).

At this time, the flickering of the distance measurement point selected by the visual axis is stopped, and the in-focus distance measurement point is turned on to allow the photographer to recognize the in-focus state.

When the photographer recognizes that the in-focus distance measurement point displayed in the finder is not correct, and releases his or her finger from the release button 41 to turn off the switch SW1 (step 120), the CPU 100 confirms the mode again (step 101), and waits until the switch SW1 is turned on if the normal photographing mode is currently selected (step 104).

On the other hand, when the photographer keeps the switch SW1 ON upon observation of the in-focus displayed distance measurement point (step 120), the CPU 100 supplies a signal to the photometry circuit 102 to perform photometry (step 121). At this time, an exposure value obtained by weighting one of the photometry areas 210 to 213 including the in-focus distance measurement point is calculated.

It is checked if the switch SW2 is turned on by further depressing the release button 41 (step 122). If the switch SW2 is OFF, the CPU confirms the state of the switch SW1 again (step 120). On the other hand, if the switch SW2 is ON, the CPU 100 transmits signals to the shutter controlling circuit 108, the motor controlling circuit 109, and the aperture driving circuit 111 to start the following shutter release operations.

More specifically, the motor M2 is energized to move the main mirror 2 upward, and the aperture 31 is stopped down. Thereafter, the magnet MG-1 is energized to open the front curtain of the shutter 4. The aperture value of the aperture 31 and the shutter speed of the shutter 4 are determined by the exposure value detected by the photometry circuit 102 and the sensitivity of the film 5. After an elapse of a predetermined shutter time, the magnet MG-2 is energized to close the rear curtain of the shutter 4 (step 123). Upon completion of exposure onto the film 5, the motor M2 is energized again to move the mirror downward and to charge the shutter. Also, the motor M1 is energized to feed the film by one frame, thus completing a series of shutter release operations (step 124).

Upon completion of the shutter release operations and the film feed operation of the camera (step 124), the CPU 100 confirms the mode again (step 101), and waits until the switch SW1 is turned on if the normal photographing mode is currently selected (step 104).

Figures 8, 8A, 8B:
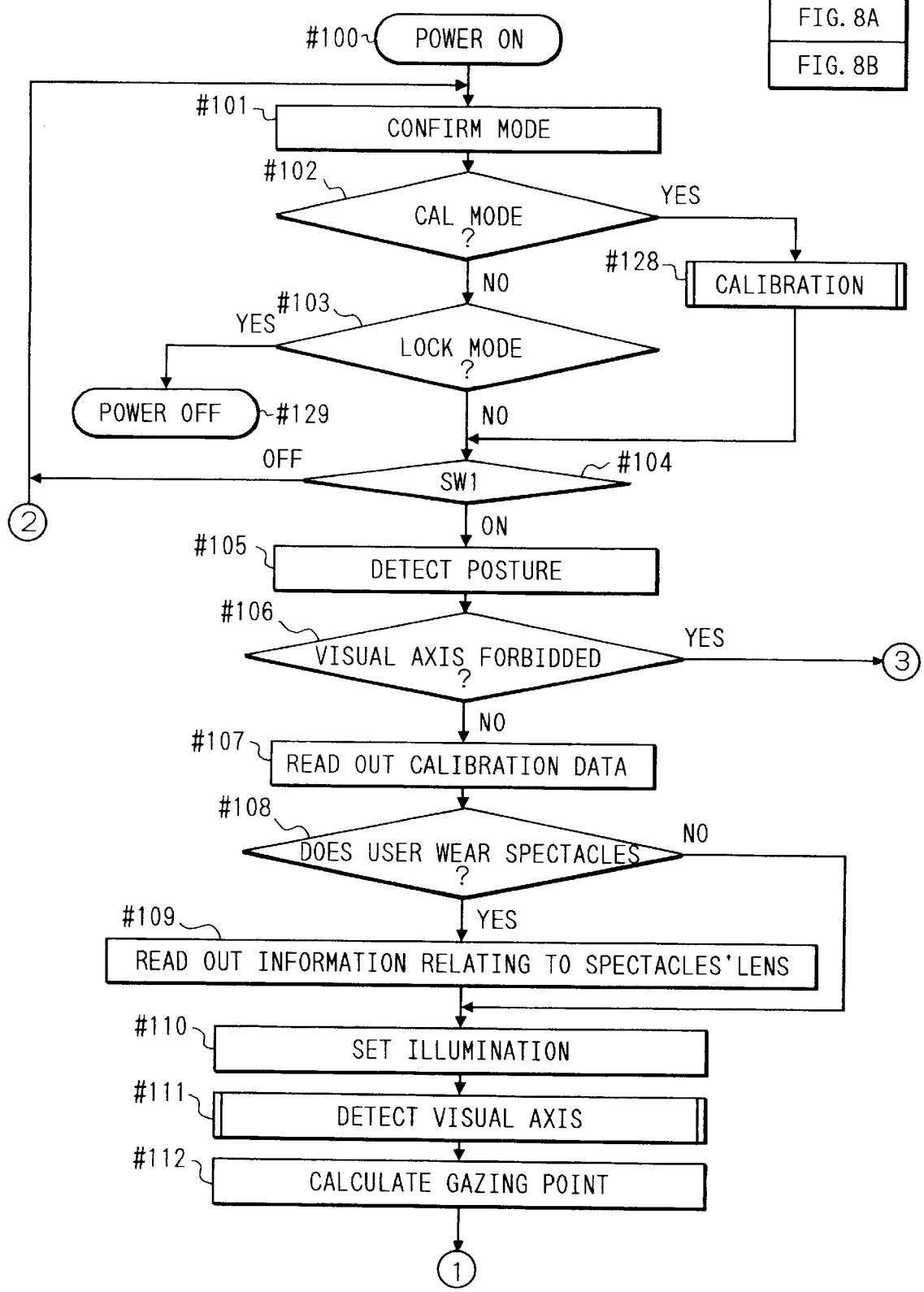
FIG. 8 is comprised of FIGS. 8A and 8B showing flow charts of the operation of the camera according to the first embodiment of the present invention.

FIG. 11 including FIGS. 11A and 11B is a flow chart showing the calibration operation of the gazing point executed in step 128 in FIG. 8A.

When the photographer turns the mode dial 44 to adjust the "CAL" position 44d to the index 55, the visual axis calibration mode is set (step 128).

The visual axis calibration mode includes an "ON" mode for performing the calibration operation, and an "OFF" mode for forbidding the calibration operation. These modes can be selected by turning the electrical dial 45. In the "ON" mode, for example, five calibration numbers (CAL1 to CAL5) can be selected, and the EEPROM 100a can store five sets of calibration data at addresses corresponding to the calibration numbers. The selected calibration number is stored in the EEPROM 100a as the calibration data number (1 to 5).

When the "OFF" mode is selected by the electrical dial 45, the calibration data number stored in the EEPROM 100a is set to be, e.g., "0", i.e., the visual axis input forbid mode is set.

The CPU 100 transmits a signal to the LCD drive circuit 105 to perform a display indicating the start of the visual axis calibration mode on the LCD 24 in the finder and the LCD 42 for monitor (step 301).

When the photographer selects a desired calibration number while observing the calibration numbers displayed on the LCD 24 in the finder or the LCD 42 for monitor, the CPU 100 confirms the selected calibration number (step 302). The CPU 100 stores the confirmed calibration number at the predetermined address on the EEPROM 100a as the calibration data number.

Subsequently, the CPU 100 confirms the photographing mode via the signal input circuit 104 (step 303). If the CPU 100 confirms that the photographer switches the photographing mode to one other than the gazing point calibration mode by turning the mode dial 44 (step 303), the CPU 100 determines that the mode is changed, and turns off calibration displays inside and outside the finder (304). Thereafter, the control returns to the photographing operation of the camera as the main routine (step 327). At this time, when the photographer switches the mode dial 44 to another photographing mode while one of the calibration numbers "CAL1" to "CAL5" is displayed, visual axis detection can be performed using the calibration data of the displayed calibration number, and the photographing operation using the visual axis information can be performed.

On the other hand, if the CPU 100 confirms that the visual axis calibration mode is kept set (step 303), it confirms the calibration number set by the electrical dial 45 again (step 305). At this time, if the calibration data number stored in the EEPROM 100a is set to be "0" to select the visual axis input forbid mode (step 305), the CPU 100 confirms the calibration number again (step 302), and waits until the photographing mode is changed (step 303). More specifically, when the mode dial 44 is switched while "OFF" is displayed on the LCD 24 in the finder and the LCD 42 for monitor, the photographing operation is performed without executing the visual axis detection.

If the calibration data number is set to be a value other than "0" (step 305), the CPU 100 detects the current posture of the camera using the posture detection means (step 306). As described above, the posture detection means processes the output signals from the mercury switch 27 and another mercury switch (not shown) as the posture detection switches SW-ANG1 and SW-ANG2 via the signal input circuit 104, and determines whether the camera is set at the horizontal or vertical position (posture) and discriminates whether the release button 41 is located at the upper or lower position if it is determined that the camera is set at the vertical position.

The calibration of the gazing point is started when the switch SW1 is turned on.

In order to prevent the camera from starting the calibration before the photographer is prepared for the calibration of the gazing point, the CPU 100 confirms the state of the switch SW1. If the switch SW1 is ON upon depression of the release button 41, the CPU 100 waits until the switch SW1 is turned off (step 307). Thereafter, if the CPU 100 confirms via the signal input circuit 104 that the switch SW1 is OFF (step 307), it supplies a signal to the LED drive circuit 106 to flicker visual index 1 for calibration of the gazing point (step 308). The visual index for calibration of the gazing point commonly uses the distance measurement point marks 200 and 204, and is superimpose-displayed in the finder. The first visual index presented first upon execution of calibration is selected depending on the posture of the camera. When the posture of the camera corresponds to the horizontal position state, the IRED drive circuit 107. This is to facilitate discrimination as to whether or not the photographer wears spectacles. More specifically, when the IREDs for a naked-eye photographer are turned on, if the photographer wears spectacles, some light components of illumination light reflected by the spectacles' lens 18 tend to become incident on the light-receiving optical system, and form an image as a ghost on the image sensor 14. The CCD read out circuit 101 A/D-converts an image signal obtained by the image sensor 14, and transmits the converted signal to the CPU 100. The CPU 100 analyzes the obtained eyeball image signal to discriminate whether or not the photographer wears spectacles (step 311). In this case, whether or not the photographer wears spectacles need only be detected. For this reason, upon detection of the eyeball image by illumination for a naked eye, it is effective to attain power savings by decreasing the illumination light amount of each IRED or by shortening the accumulation time of the image sensor driven in synchronism with the illumination of the IREDs.

If it is determined that the photographer does not wear spectacles (step 312), the illumination IREDs for executing the visual axis detection are set (step 314).

On the other hand, if it is determined that the photographer wears spectacles (step 312), spectacles' lens information, i.e., the radius of curvature of the the visual index for calibration begins to flicker from the left-end distance measurement point 200. On the other hand, when the posture of the camera corresponds to the first vertical position state in which the release button 41 is located at the upper position, the visual index for calibration begins to flicker from the distance measurement point 200 at the lower end with respect to the photographer. Similarly, when the posture of the camera corresponds to the second vertical position state in which the release button 41 is located at the lower position, the visual index for calibration begins to flicker from the distance measurement point 204 at the lower end with respect to the photographer.

The CPU 100 waits until it receives the ON signal of the switch SW1 as a trigger signal for starting the calibration of the gazing point (step 309). When the photographer views the visual index which begins to flicker and depresses the release button 41 to turn on the switch SW1 (step 309), the CPU 100 supplies a signal to the LED drive circuit 106 to turn on visual index 1 for calibration (step 310).

Furthermore, the CPU 100 transmits a signal to the IRED drive circuit 107 to turn on the IREDs for illuminating the eyeball 15 of the photographer. At this time, the CPU 100 selects and turns on the IREDs 13a, 13b, 13e, and 13f for a naked-eye photographer via spectacles' lens 18, is calculated from the previously detected eyeball image signal.

The CPU 100 as the spectacles' lens information detection means detects the position of the ghost generated due to the presence of the spectacles from the eyeball image signal. Since the light intensity of the ghost is strong, an image exceeding a predetermined threshold value can be determined as a ghost, and its center of gravity can be calculated. The spectacles have two lens surfaces which reflect illumination light. Since these lens surfaces have different positions and radii of curvature, ghosts are formed to have different positions and magnitudes depending on which one of the lens surfaces contributed to their formation. By comparing the positions and magnitudes of ghosts, a lens surface which reflected light and formed a particular set of ghosts can be determined. Upon detection of the ghost position, the radius of curvature, Rg, of the spectacles' lens 18 is calculated by:

$$Rg \text{ [mm]} = -[(2*\Delta xg*s1*s2)/\{\Delta xg*(s1+s2)-2*sxi*s3\}] \quad (9)$$

where

Δxg: the interval, in the x-direction on the image sensor, between ghosts formed by the four IREDs due to the presence of the spectacles' lens 18 (unit: [mm])

s1: the distance from the front-side principal point of the light-receiving optical system to the lens surface of the spectacles (unit: [mm])

s2: the distance from the IRED setting surface (eyepiece lens exit surface) to the lens surface of the spectacles (unit: [mm])

s3: the distance from the rear-side principal point of the light-receiving optical system to the chip surface of the image sensor 14 (unit: [mm])

Since the first and second lens surfaces of the spectacles' lens 18 have different radii of curvature, ghosts are formed at different positions on the image sensor 14. As a result, since the interval between the ghosts on the image sensor 14 formed by light reflected by the first lens surface is different from the interval between the ghosts on the image sensor 14 formed by light reflected by the second lens surface, the radii of curvatures of the lens surfaces are calculated by substituting these values in formula (9) above. At this time, needless to say, since the first and second lens surfaces have different positions due to the thickness of the lens, the parameters s1 and s2 are set for each of lens surfaces to calculate the radius of curvature.

Upon detection of the spectacles' lens information (the radius of curvature of the spectacles' lens), this information is stored at a predetermined address of the EEPROM 100a in accordance with the currently selected calibration number (step 313). If spectacles' lens information has already been stored in on the EEPROM 100a, a weighted mean value of the newly detected spectacles' lens information and the already stored spectacles' lens information is calculated and stored in memory.

After the spectacles' lens information is detected and is stored in the memory means (step 313), the CPU 100 sets the illumination IREDs for executing the visual axis detection (step 314). The illumination IREDs are selected by the IRED drive circuit 107 to illuminate the eyeball 15 of the photographer from a lower position.

More specifically, when the posture of the camera detected by the posture detection means corresponds to the horizontal position state, the IREDs 13a and 13b are selected. In this case, when the photographer wears spectacles, the IREDs 13c and 13d are selected. On the other hand, when the posture of the camera corresponds to the first vertical position state in which the release button 41 is located at the upper position, the IREDs 13a and 13e are selected, or the IREDs 13c and 13g are selected for a photographer who wears spectacles. When the posture of the camera corresponds to the second vertical position state in which the release button 41 is located at the lower position, the IREDs 13b and 13f are selected, or the IREDs 13d and 13h are selected for a photographer who wears spectacles.

After the illumination IREDs are set (step 314), the visual axis detection is executed (step 315). Each time a single visual axis detection is completed, the number of times of visual axis detection is incremented. The flow of the visual axis detection is as shown in FIG. 9. Upon completion of the visual axis detection (step 315), the number of times of visual axis detection is confirmed. If the number of times of visual axis detection has not reached a predetermined value sufficient for obtaining the calibration data of the gazing point (step 316), the visual axis detection is continued (step 315). If the number of times of visual axis detection has reached a predetermined value sufficient for obtaining the calibration data of the gazing point (step 316), the visual axis detection for the currently displayed visual index is completed. The CPU 100 controls a sound generator (not shown) to generate an electrical sound several times so as to allow the photographer to recognize the end of visual axis detection. At the same time, the CPU 100 turns off the visual index via the LED drive circuit 106 (step 317).

Subsequently, the CPU 100 executes data processing of a plurality of pieces of detected visual axis information (θx, θy) and the pupil diameter Rp (step 318). This processing excludes data detected when the visual axis moves against the photographer's will while he or she views a visual index. The CPU 100 excludes data with large deviations from the average value of detected data, and calculates the average value of the remaining data. Furthermore, the CPU 100 discriminates if the data after the data processing is effective (step 319). The discrimination is attained by comparing the number of effective data of the detected data and their average value with reference values. For example, when the number of effective values is 5 or less with respect to 10 detected data, and their average value exceeds a predetermined range, the CPU 100 determines that acquisition of the calibration data for the visual index is unsuccessful (step 319). In this case, the CPU 100 generates an electrical sound using a sound generator (not shown) for a predetermined period of time, and transmits a signal to the LCD drive circuit 105 to flicker a "CAL" display on the LCD 24 in the finder and the LCD 42 for monitor, thus generating an alarm to the photographer (step 326).

On the other hand, when the number of effective data is larger than 5, and their average value falls within the predetermined range, the CPU 100 determines that the data after the data processing is effective (step 319). Furthermore, the CPU 100 discriminates if the calibration of the gazing point is completed (step 320). If the calibration for the second visual index is not completed (step 320), the CPU 100 starts the visual axis detection for the second visual index (step 307). The subsequent operations are as has been described above.

Upon completion of the calibration for the second visual index (step 320), the CPU 100 stores the processed data at a predetermined address on the EEPROM 100a (step 321). The calibration data to be stored in the EEPROM 100a includes the average value of the rotation angles of the eyeball, the average value of the pupil diameters, and the product of these values. Note that the calibration data is not updated for each calibration, but is added to the already stored value.

After the number of times of calibration is stored in memory together with the calibration data (step 321), the CPU 100 performs a calibration end display of the gazing point via the LCD drive circuit 105 and the LED drive circuit 106 (step 322). The LED drive circuit 106 energizes the superimpose LEDs 21 to flicker the two visual indices several times, and the LCD drive circuit 105 transmits signals to the LCDs 24 and 42 to display "END" for a predetermined period of time.

When the photographer turns on the switch SW1 after the calibration end display (step 322) or after the calibration NG display (step 326), the CPU 100 detects the ON signal of the switch SW1 via the signal input circuit 104 (step 323), and the flow advances to the first step of the calibration of the gazing point so as to execute the calibration of the gazing point again (step 306).

After a series of calibrations for the gazing point, the camera waits until the photographer operates the electrical dial 45 or the mode dial 44. When the photographer selects another calibration number by turning the electrical dial 45, the CPU 100 detects the change in calibration number via the signal input circuit 104 (step 324), and the flow advances to the first step (301) of the gazing point calibration routine.

On the other hand, when the photographer turns the mode dial 44 to select another photographing mode, the CPU 100 detects the change in photographing mode via the signal input circuit 104 (step 325), and the flow returns to the main routine (step 327).

Figure 12B:
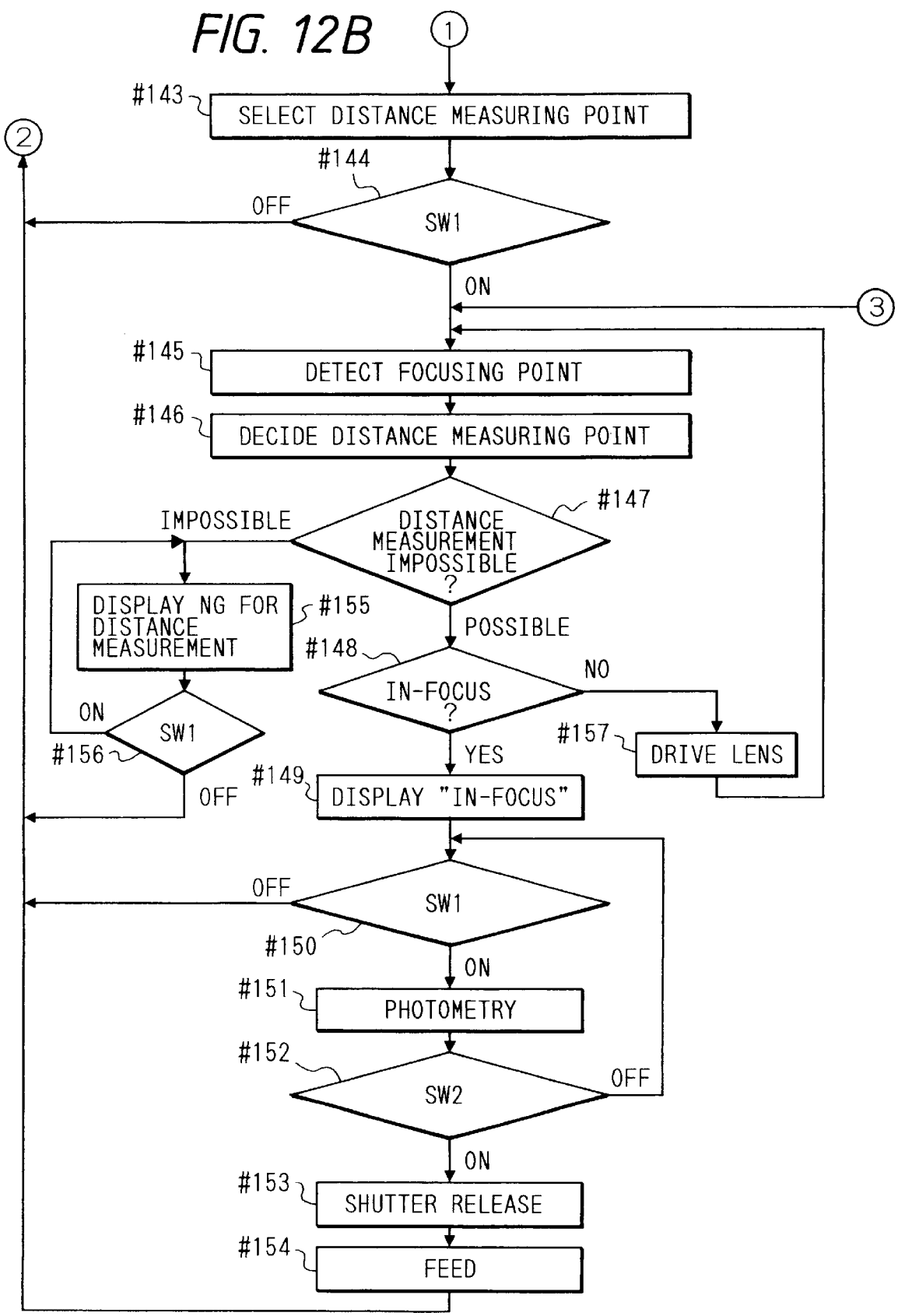
FIG. 12 is comprised of FIGS. 12A and 12B showing flow charts of the operation of a camera according to the second embodiment of the present invention.

FIGS. 12A and 12B are flow charts showing the operation of a camera with a visual axis detection function according to the second embodiment of the present invention. Since the camera of this embodiment has the same arrangement as that shown in FIGS. 3 to 7, the operation of the camera will be explained below using these drawings.

When the mode dial 44 is turned to set the camera from an inoperative state (lock state) to a predetermined photographing mode, the power supply of the camera is turned on (step 130).

The CPU 100 confirms the selected mode of the mode dial 44 via the signal input circuit 104 (step 131). As a result, if the mode dial 44 is set in the visual axis calibration (CAL) mode (step 132), calibration of the gazing point is executed (step 158). The calibration of the gazing point will be described later. Upon completion of the calibration of the gazing point, the camera waits until the switch SW1 is turned on upon depression of the release button 41 (step 134).

If the mode dial 44 is not set in the visual axis calibration mode (step 132) but is set in the power lock mode (step 133), the power supply of the camera is turned off (step 159).

On the other hand, if the mode dial 44 is set in the normal photographing mode, the camera waits until the switch SW1 is turned on upon depression of the release button 41 (step 134). When it is detected via the signal input circuit 104 that the switch SW1 is turned on upon depression of the release button 41, the CPU 100 detects the current posture of the camera using posture detection means (step 135).

The CPU 100 then confirms the calibration data number, which indicates one of a plurality of calibration data to be used in visual axis detection, by the EEPROM 100a. At this time, if the confirmed calibration data number is set in the visual axis input forbid mode (step 136), the CPU 100 immediately executes focusing point detection for the respective distance measurement points without executing any visual axis detection operation (step 145).

On the other hand, if the calibration data number is set to be a value corresponding to the visual axis input mode (step 136), the CPU 100 reads out calibration data corresponding to the calibration data number from a predetermined address of the EEPROM 100a (step 137). The calibration data includes information indicating whether or not a photographer wears spectacles, and spectacles' lens information (the radius of curvature of the spectacles' lens) of spectacles for a photographer who wears spectacles. If the CPU 100 determines based on the calibration data that the photographer does not wear spectacles (step 138), the CPU 100 sets illumination for a naked-eye photographer to execute visual axis detection (step 140).

On the other hand, if the CPU 100 determines based on the readout calibration data that the photographer wears spectacles (step 138), the CPU 100 executes detection of the spectacles' lens information (step 139). The spectacles' lens information to be detected includes the value of the radius of curvature of the spectacles' lens.

The detection method of the spectacles' lens information will be explained below.

The CPU 100 transmits a signal to the IRED drive circuit 107 to select and turn on the IREDs 13a, 13b, 13e, and 13f for a naked-eye photographer. The CCD read out circuit 101 A/D-converts an image signal obtained by the image sensor 14, and transmits the converted signal to the CPU 100. Furthermore, the CPU 100 analyzes the obtained eyeball image signal to detect the position of a ghost generated due to the presence of the spectacles. Since the light intensity of the ghost is strong, an image exceeding a predetermined threshold value can be determined as a ghost, and its center of gravity can be calculated. The spectacles have two lens surfaces which reflect illumination light. Since these lens surfaces have different positions and radii of curvature, ghosts are formed to have different positions and magnitudes depending on which one of the lens surfaces contributed to their formation. By comparing the positions and magnitudes of ghosts, a lens surface which reflected light and formed a particular set of ghosts can be determined. Upon detection of the ghost position, the radius of curvature, Rg, of the spectacles' lens 18 is calculated by formula (9) above.

Similarly, the coordinate position (sxg, syg, szg) of the center of curvature of the spectacles' lens 18 is calculated as follows based on the ghost position:

$$sxg \text{ [mm]} = [\{2*s1*s2 + Rg*(s1+s2)\}/(2*s2*s3)]*(xg0-31 \ xs)*\text{pitch}(10)$$

$$syg \text{ [mm]} = \{(yg0-ys)/(xg0-xs)\}*sxg - (Rg*syi)/(2*s2) \quad (11)$$

$$szg \text{ [mm]} = s2 + Rg \quad (12)$$

where (xg0, yg0) represents the central position of four ghosts formed on the image sensor (unit: [pixel]), syi is the absolute distance between each illumination IRED and the optical axis (z-axis) of the light-receiving optical system (unit: [mm]), and s1, s2, and s3 are the above-mentioned parameters.

Upon detection of the spectacles' lens information (step 139), the CPU 100 sets illumination for executing the visual axis detection (step 140).

After the illumination for the eyeball 15 of the photographer is set (step 140), the CPU 100 executes the visual axis detection (step 141). The flow of the visual axis detection is substantially the same as that shown in FIG. 9, and will be described below with reference to FIG. 9.

When the eyeball 15 of the photographer is illuminated with light emitted by the illumination means, some light components of infrared rays reflected by the eyeball 15 are focused on the image sensor 14 via the light-receiving optical system as the light-receiving means. An image output from the image sensor 14 is A/D-converted by the CCD read out circuit 101, and the converted image data is analyzed by the CPU 100 as visual axis calculation means. When the CPU 100 detects the cornea reflected images and the central position of the pupil as the feature points of the eyeball, it calculates the visual axis [(θx, θy): the rotation angles of the eyeball] of the photographer on the basis of formulas (2) and (3) above (step 200). At this time, if the photographer does not wear spectacles (step 201), the flow returns to the main routine (step 204).

On the other hand, if the photographer wears spectacles (step 201), the CPU 100 calculates a relative displacement amount of the vertex of the spectacles' lens from a reference position of the camera, e.g., the central position of the exit surface (a surface on the photographer side) of the eyepiece lens 11, on the basis of the spectacles' lens information detected immediately before this visual axis detection. If the displacement of the vertex of the first surface of the spectacles' lens from the finder optical axis is represented by (sgx, sgy), the displacement is given by:

$$sgx \text{ [mm]} = \{(s2-szg1)/(szg1-szg20)\}*(sxg1-sxg2) + sxg1 \quad (14)$$

$$sgy \text{ [mm]} = \{(s2-szg1)/(szg1-szg2)\}*(syg1-syg2) + syg1 \quad (15)$$

where (sxg1, syg1, szg1) and (sxg2, syg2, szg2) are the central positions of the curvatures of the first and second surfaces of the spectacles' lens.

If the displacement [=sqr(sgx^2+sgy^2)] of the vertex of the first lens surface of the spectacles' lens from the finder optical axis is smaller than a predetermined value (e.g., 4.0 [mm]) (step 202), since the influence of the refraction effect of the spectacles' lens is small, the flow returns to the main routine without performing visual axis correction (step 204).

If the displacement [=sqr(sgx^2+sgy^2)] of the vertex of the first lens surface of the spectacles' lens from the finder optical axis is equal to or larger than the predetermined value (e.g., 4.0 [mm]) (step 202), the CPU 100 corrects the positions of the cornea reflected images and the value of the central pixel (xs, ys) of the image sensor 14 on the basis of the detected spectacles' lens information, and thereafter, calculates the visual axis (θx, θy) of the photographer on the basis of formulas (2) and (3) above (step 203). The method of correcting the positions of the cornea reflected images and the central pixel (xs, ys) of the image sensor 14 is as described above. After the visual axis of the photographer is corrected and calculated (step 203), the flow returns to the main routine to continue the camera sequence (step 204).

Referring back to FIGS. 12A and 12B, upon completion of visual axis detection (step 141), the CPU 100 calculates the gazing point in the finder from the calculated visual axis [the rotation angles ($\theta x$, $\theta y$) of the eyeball] (step 142). The coordinate position (x, y) of the gazing point in the finder is calculated by formulas (4) and (5) above.

After the gazing point in the finder, where the photographer gazes, is calculated (step 142), the distance measurement point to be subjected to focusing point detection is selected based on the coordinate position of the gazing point (step 143). In this case, a distance measurement point closest to the coordinate position of the gazing point is selected. Furthermore, the CPU 100 transmits a signal to the LED drive circuit 106 to display the selected distance measurement point in the finder.

If the photographer recognizes that the distance measurement point superimpose-displayed in the finder is different from that he or she intended upon observation of the displayed point, and releases his or her finger from the release button 41 to turn off the switch SW1, when the CPU 100 detects this operation via the signal input circuit 104 (step 144), the CPU 100 confirms the mode again via the signal input circuit 104 (step 131), and waits until the switch SW1 is turned on if the normal photographing mode is currently selected (step 134).

When the photographer keeps the switch SW1 ON upon observation of the superimpose-displayed distance measurement point (step 144), the CPU 100 executes focusing point detection of the distance measurement point, selected by the visual axis information, using the auto focusing point detecting circuit 103 (step 145). Upon completion of the focusing point detection (step 145), the CPU 100 then determines the distance measurement point to be subjected to focusing point adjustment of the photographing lens 1 in practice (step 146). At this time, if the camera is set in the visual axis input forbid mode, a distance measurement point corresponding to the shortest object distance of all the distance measurement points subjected to focusing point detection is determined as one to be subjected to focusing point adjustment of the photographing lens 1 in practice.

It is checked if distance measurement at the distance measurement point determined by the visual axis information is impossible (step 147). If distance measurement is impossible, the CPU 100 supplies a signal to the LCD drive circuit 105 to flicker the in-focus mark 50 on the LCD 24 in the finder, thereby generating an alarm to inform the photographer of the fact that the distance measurement is NG (impossible) (step 156). This alarm display is continued until the switch SW1 is released (step 157).

If the determined distance measurement point can be subjected to distance measurement (step 147) and if the focusing point adjusting state of the photographing lens 1 corresponding to the distance measurement point is not in an in-focus state (step 148), the CPU 100 supplies a signal to the lens focusing point adjusting circuit 110 to drive a focusing lens 1a of the photographing lens 1a by a predetermined amount (step 155). After the lens is driven, the CPU 100 performs focusing point detection for the determined distance measurement point via the auto focusing point detecting circuit 103 again (step 145) to check if the photographing lens 1 has reached an in-focus state (step 148). If the photographing lens has reached an in-focus state (step 148), the CPU 100 supplies a signal to the LCD drive circuit 105 to turn on the in-focus mark 50 on the LCD 24 in the finder, and also supplies a signal to the LED drive circuit 106 to perform an in-focus display on the in-focus distance measurement point (step 149).

At this time, the flickering of the distance measurement point selected by the visual axis is stopped, and the in-focus distance measurement point is turned on to allow the photographer to recognize the in-focus state.

When the photographer recognizes that the in-focus distance measurement point displayed in the finder is not correct, and releases his or her finger from the release button 41 to turn off the switch SW1 (step 150), the CPU 100 confirms the mode again (step 131), and waits until the switch SW1 is turned on if the normal photographing mode is currently selected (step 134).

On the other hand, when the photographer keeps the switch SW1 ON upon observation of the in-focus displayed distance measurement point (step 150), the CPU 100 supplies a signal to the photometry circuit 102 to perform photometry (step 151). At this time, an exposure value obtained by weighting one of the photometry areas 210 to 213 including the in-focus distance measurement point is calculated.

It is checked if the switch SW2 is turned on by further depressing the release button 41 (step 152). If the switch SW2 is OFF, the CPU confirms the state of the switch SW1 again (step 150). On the other hand, if the switch SW2 is ON, the CPU 100 transmits signals to the shutter controlling circuit 108, the motor controlling circuit 109, and the aperture driving circuit 111 to start the following shutter release operations.

More specifically, the motor M2 is energized to move the main mirror 2 upward, and the aperture 31 is stopped down. Thereafter, the magnet MG-1 is energized to open the front curtain of the shutter 4. The aperture value of the aperture 31 and the shutter speed of the shutter 4 are determined by the exposure value detected by the photometry circuit 102 and the sensitivity of the film 5. After an elapse of a predetermined shutter time, the magnet MG-2 is energized to close the rear curtain of the shutter 4 (step 153). Upon completion of exposure onto the film 5, the motor M2 is energized again to move the mirror downward and to charge the shutter. Also, the motor M1 is energized to feed the film by one frame, thus completing a series of shutter release operations (step 154).

Upon completion of the shutter release operations and the film feed operation of the camera (step 154), the CPU 100 confirms the mode again (step 131), and waits until the switch SW1 is turned on if the normal photographing mode is currently selected (step 134).

According to each of the embodiments described above, whether or not an observer wears spectacles is detected by analyzing an eyeball image. If the observer wears spectacles, the radius of curvature of the spectacles, i.e., spectacles' lens information, is detected based on the center of gravity of ghosts in the eyeball image, and the visual axis of the observer is corrected based on this spectacles' lens information. As a result, high-precision visual axis detection can be attained, and an equivalent visual axis input function can be provided for both a naked-eye observer and an observer who wears spectacles.

In each of the above embodiments, the four light sources for a naked-eye observer and the four light sources for an observer who wears spectacles are arranged. However, only at least two of each light sources need be arranged for such observers. In this case, upon detection of the spectacles' lens information, the light sources for both the observer who wears spectacles and the naked-eye observer are used. Of course, upon detection of the spectacles' lens information, at least three light sources for a naked-eye observer are arranged, and only these light sources are used to allow detection of spectacles' lens information with higher precision.

In each of the above embodiments, the spectacles' lens information is obtained by calculations for optical detection. However, the present invention is not limited to this. For example, spectacles' lens information (the radius of curvature and the central position of the curvature) may be input from an external device, and the visual axis may be corrected based on the input information.

In the above description, the present invention is applied to a camera such as a single-lens reflex camera, a lens-shutter camera, a video camera, or the like, but may also be applied to other optical apparatuses, other types of apparatuses, and a unit constituting such an apparatus.

Furthermore, the present invention allows appropriate combinations of the above embodiments or their techniques.

What is claimed is:

1. An optical apparatus comprising:
    detection means for detecting a corneal image reflected by a cornea of an eye, and for detecting an optical parameter of a spectacle lens; and
    calculation means for correcting a corneal image position detected by said detection means based on the optical parameter of the spectacle lens detected by said detection means, and for calculating a rotation amount of the eye based on the corrected corneal image position.

2. An apparatus according to claim 1, wherein the optical parameter of the spectacle lens is a radius of curvature of the spectacle lens.

3. An apparatus according to claim 1, wherein the optical parameter is a position of a center of curvature of the spectacle lens.

4. An apparatus according to claim 1, wherein when a displacement amount of a position of a center of curvature of the cornea of the eye from an optical axis of said detection means is not less than a predetermined threshold value, said calculation means calculates the amount of rotation of the eye using the detected corneal image of the eye and the optical parameter of the spectacle lens; and when the displacement amount is smaller than the threshold value, said calculation means calculates the amount of rotation of the eye using the detected corneal image of the eye without using the optical parameter of the spectacle lens.

5. An apparatus according to claim 4, wherein the position of the center of curvature of the cornea of the eye is calculated using the detected corneal image of the eye detected by said detection means.

6. An apparatus according to claim 5, wherein said detection means detects light reflected by a reflection surface of the spectacles, and the optical parameter of the spectacle lens is determined using the reflected light.

7. An apparatus according to claim 1, wherein said detection means has an image sensor and an image information optical system for detecting a distance between an optical axis of said image formation optical system and an optical axis of the spectacle lens, and when the displacement amount is not less than a predetermined threshold value, said calculation means calculates the amount of rotation of the eye using the detected corneal image of the eye and the optical parameter of the spectacle lens; and when the displacement amount is smaller than the threshold value, said calculation means calculates the amount of rotation of the eye using the detected corneal image of the eye without using the optical parameter of the spectacle lens.

8. An apparatus according to claim 7, wherein said detection means detects light reflected by a reflection surface of the spectacle lens, and the optical parameter of the spectacle lens is determined using the reflected light.

9. An apparatus according to claim 1, wherein said detection means detects light reflected by a reflection surface of the spectacle lens, and the optical parameter of the spectacle lens is determined using the reflected light.

10. An apparatus according to claim 9, wherein said detection means comprises a plurality of light-emitting means for illuminating the eye with a respective plurality of light beams, and for detecting the optical parameter of the spectacle lens using a plurality of light beams emitted by said plurality of light-emitting means and reflected by the reflection surface of the spectacle lens.

11. An apparatus according to claim 10, wherein the number of said light-emitting means used for detecting the optical parameter of the spectacle lens is 3 or 4.

12. An apparatus according to claim 1, further comprising:
    memory means for storing an optical parameter of the spectacle lens.

13. An apparatus according to claim 1, wherein the amount of rotation of the eye is determined on the basis of a positional relationship between an image formed by light reflected by a cornea of the eye and an image of a pupil of the eye.

14. An optical apparatus comprising:
    illumination means for illuminating an eye of a user;
    light detection means for detecting light reflected by an eye of a user;
    discrimination means for determining whether or not a user wears spectacles;
    memory means for storing an optical parameter of a lens of the spectacles worn by a user; and
    rotation amount calculation means for calculating an amount of rotation of the eye using an output from the light detection means,
    wherein, when said discrimination means determines that a user does not wear spectacles, said rotation amount calculation means calculates the amount of rotation of the eye based on the output from said light detection means, and when the discrimination means determines that the user does wear spectacles, said rotation amount calculation means corrects a corneal image position detected by said light detection means based on the optical parameter of the lens of the spectacles stored in said memory means and then calculates the amount of rotation of the eye using the output from said light detection means.

15. An apparatus according to claim 14, wherein the optical parameter of the spectacles is a radius of curvature of a lens of the spectacles.

16. An apparatus according to claim 14, wherein said discrimination means detects whether or not the output from said light detection means includes a signal indicating light reflected by the spectacles.

17. An apparatus according to claim 14, wherein the optical parameter of a lens of the spectacles is detected using said illumination means and said light detection means.

18. An apparatus according to claim 17, wherein said illumination means comprises a plurality of light-emitting elements.

19. An apparatus according to claim 17, wherein when a user wears spectacles, said rotation amount calculation means calculates the amount of rotation of the eye using the output from said light detection means and the optical parameter of the lens of the spectacles if a distance between a position of a center of curvature of a cornea of the eye and an optical axis of said light detection means is not less than a predetermined threshold value, and said rotation amount calculation means calculates the amount of rotation of the eye using the output from said light detection means without using the optical parameter of the lens of the spectacles if the distance is smaller than the predetermined threshold value.

20. An apparatus according to claim 17, wherein when a user wears spectacles, said rotation amount calculation means calculates the amount of rotation of the eye using the output from said light detection means and the optical parameter of the lens of the spectacles if a distance between an optical axis of the spectacles and an optical axis of said light detection means is not less than a predetermined threshold value, and said rotation amount calculation means calculates the amount of rotation of the eye using the output from said light detection means without using the optical parameter of the lens of the spectacles if the distance is smaller than the threshold value.

21. An apparatus according to claim 17, wherein the optical parameter of the lens of the spectacles is a radius of curvature of the lens of the spectacles.

22. An optical apparatus comprising:

illuminating means for illuminating an eyeball of a user wearing spectacles, through the spectacles;

light-receiving means for receiving a reflective light from the eyeball and a reflective light from a lens of the spectacles;

first detecting means for detecting a position of a corneal image of the eyeball using reflective light received by said light-receiving means from the eyeball;

second detecting means for detecting an optical parameter of a lens of the spectacles using the reflective light received by said light-receiving means from the spectacles; and calculating means for calculating an amount of rotation of the eyeball on the basis of a detection result of said first detecting means and a detection result of said second detecting means.

23. An apparatus according to claim 22, wherein the optical parameter of the lens of the spectacles is a curvature of the lens of the spectacles.

24. An apparatus according to claim 23, wherein said calculating means obtains a positional relationship between the eyeball and the lens of the spectacles on the basis of the detection result of said first detecting means and the detection result of said second detecting means and thereafter determines whether or not the detection result of said second detection means is used for a calculation of an amount of rotation of the eyeball according to the positional relationship.

25. An apparatus according to claim 22, further comprising:

memory means for storing the optical parameter of the lens of the spectacles.

* * * * *

UNITED STATES PATENT AND TRADEMARK OFFICE
CERTIFICATE OF CORRECTION

PATENT NO. : 5,983,030

DATED : November 9, 1999

INVENTOR(S): AKIHIKO NAGANO

Page 1 of 2

It is certified that error appears in the above-identified patent and that said Letters Patent is hereby corrected as shown below:

On the title page:

At [56] FOREIGN PATENT DOCUMENTS

```
"2264633 1/1990" should read --2-264633 10/1990--.
"2264632 10/1990" should read --2-264632 10/1990--.
"4138431 5/1992" should read --4-138431 5/1992--.
"4138432 5/1992" should read --4-138432 5/1992--.
"5100147 4/1993" should read --5-100147 4/1993--.
```

Column 2

Line 64, "Japanese" should read --¶ Japanese--.

Column 18

Line 1, "(xg0-31 xs)*" should read --(xg0-xs)*--.
Line 45, "(szg1-szg20}* should read --(szg1-szg2)}*--.

UNITED STATES PATENT AND TRADEMARK OFFICE
CERTIFICATE OF CORRECTION

PATENT NO. : 5,983,030

DATED : November 9, 1999

INVENTOR(S): AKIHIKO NAGANO

It is certified that error appears in the above-identified patent and that said Letters Patent is hereby corrected as shown below:

<u>Column 19</u>

Line 61, "lens" should read --lens 1a--.

<u>Column 24</u>

Line 16, "claim 23," should read --claim 22,--.

Signed and Sealed this

Nineteenth Day of September, 2000

Attest:

Q. TODD DICKINSON

Attesting Officer

Director of Patents and Trademarks